United States Patent
Nakano et al.

(10) Patent No.: US 9,847,578 B2
(45) Date of Patent: Dec. 19, 2017

(54) ANTENNA DEVICE AND COMMUNICATION TERMINAL APPARATUS

(71) Applicant: Murata Manufacturing Co., Ltd., Nagaokakyo-shi, Kyoto-fu (JP)

(72) Inventors: Shinichi Nakano, Nagaokakyo (JP); Noboru Kato, Nagaokakyo (JP); Kuniaki Yosui, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/014,179

(22) Filed: Feb. 3, 2016

(65) Prior Publication Data
US 2016/0156104 A1 Jun. 2, 2016

Related U.S. Application Data

(60) Division of application No. 14/066,793, filed on Oct. 30, 2013, which is a continuation of application No. PCT/JP2012/064888, filed on Jun. 11, 2012.

(30) Foreign Application Priority Data

Jun. 13, 2011 (JP) ................................. 2011-131193
Feb. 24, 2012 (JP) ................................. 2012-038983

(51) Int. Cl.
| H01Q 7/06 | (2006.01) |
| G06K 7/10 | (2006.01) |
| G06K 19/077 | (2006.01) |
| H01Q 1/24 | (2006.01) |
| H01Q 1/22 | (2006.01) |
| H01Q 7/08 | (2006.01) |

(52) U.S. Cl.
CPC .......... *H01Q 7/06* (2013.01); *G06K 7/10178* (2013.01); *G06K 19/07794* (2013.01); *H01Q 1/2216* (2013.01); *H01Q 1/24* (2013.01); *H01Q 1/243* (2013.01); *H01Q 7/08* (2013.01)

(58) Field of Classification Search
None
See application file for complete search history.

(56) References Cited

U.S. PATENT DOCUMENTS

| 7,699,231 B2 * | 4/2010 | Yamaguchi | .......... G06K 7/0008 |
| | | | 235/449 |
| 2012/0098724 A1 * | 4/2012 | Yosui | ................. G06K 7/10336 |
| | | | 343/788 |

FOREIGN PATENT DOCUMENTS

| JP | 2008306689 A | * 12/2008 |
| JP | 2009-021970 | * 1/2009 |

OTHER PUBLICATIONS

Nakano et al., "Antenna Device and Communication Terminal Apparatus", U.S. Appl. No. 14/066,793, filed Oct. 30, 2013.

\* cited by examiner

*Primary Examiner* — Robert Karacsony
(74) *Attorney, Agent, or Firm* — Keating & Bennett, LLP

(57) ABSTRACT

An antenna device includes a feed coil connected to a feed circuit, and a coil antenna disposed near the feed coil. A ferrite sheet, in which a magnetic loss term in a usable frequency band is relatively large, is provided between the feed coil and the coil antenna. The feed coil and the coil antenna are magnetically coupled to each other via the ferrite sheet. With this configuration, signal transmission efficiency between the feed coil and the coil antenna is enhanced.

10 Claims, 23 Drawing Sheets

FIG. 16A
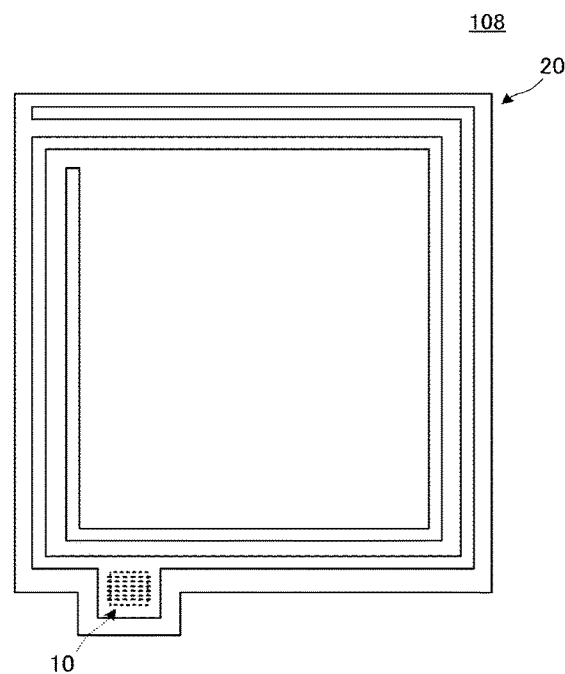
FIG. 16B
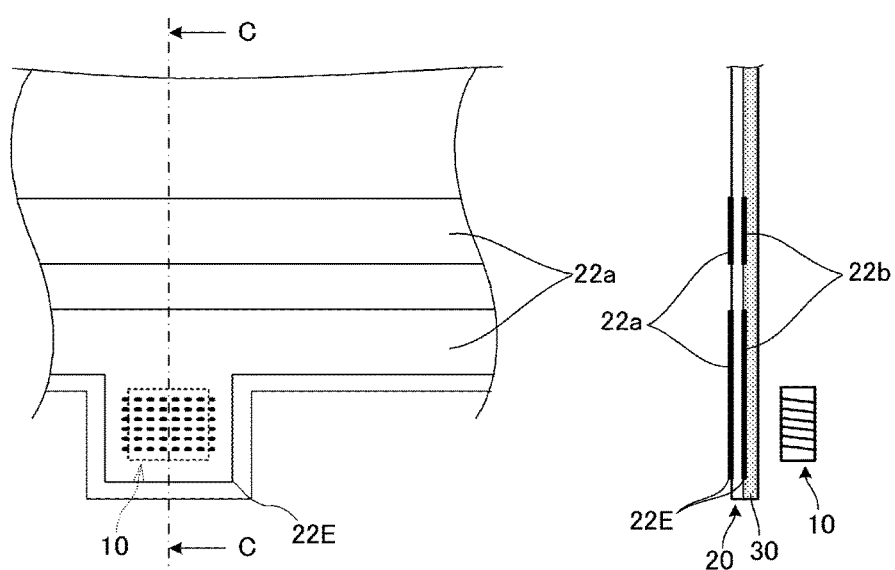
FIG. 16C

| PERMEABILITY | THICKNESS (mm) | PERMEABILITY × THICKNESS | COMMUNICATION DISTANCE (mm) | |
|---|---|---|---|---|
| 50 | 0.05 | 2.50 | 36 | |
| 50 | 0.10 | 5.00 | 36 | |
| 50 | 0.20 | 10.00 | 38 | |
| 50 | 0.25 | 12.50 | 41 | |
| 50 | 0.30 | 15.00 | 47 | |
| 50 | 0.35 | 17.50 | 40 | |
| 50 | 0.40 | 20.00 | 29 | ← NG |
| 75 | 0.05 | 3.75 | 36 | |
| 75 | 0.10 | 7.50 | 37 | |
| 75 | 0.20 | 15.00 | 46 | |
| 75 | 0.25 | 18.75 | 33 | |
| 75 | 0.30 | 22.50 | 28 | ← NG |
| 150 | 0.05 | 7.50 | 38 | |
| 150 | 0.10 | 15.00 | 46 | |
| 150 | 0.20 | 30.00 | 26 | ← NG |

ANTENNA DEVICE AND COMMUNICATION TERMINAL APPARATUS

BACKGROUND OF THE INVENTION

1. Field of the Invention

The present invention relates to antenna devices and communication terminal apparatuses. In particular, the present invention relates to an antenna device preferably for use in an RFID tag or a reader/writer that operates in an HF band, and a communication terminal apparatus including the antenna device.

2. Description of the Related Art

RFID (Radio Frequency Identification) systems are widely used as billing systems or article management systems. In an RFID system, a reader/writer and an RFID tag are caused to perform wireless communication in a noncontact manner, and radio-frequency signals are transmitted and received between these devices. The reader/writer and the RFID tag each include an RFID IC chip for processing radio-frequency signals and an antenna for transmitting and receiving radio-frequency signals. A coil antenna is used as an antenna in the case of, for example, an HF-band RFID system utilizing a 13.56 MHz band. The coil antenna on the reader/writer side and the coil antenna on the tag side are coupled to each other via an induction magnetic field.

In recent years, HF-band RFID systems have been utilized for communication terminal apparatuses such as mobile phones, and the communication terminal apparatuses have been used as readers/writers or RFID tags in some cases. In these cases, an RFID IC chip is mounted on a printed wiring board, and an antenna is adhered to a terminal housing or is provided in a free space in the terminal housing. Thus, the RFID IC chip and the antenna are connected to each other in a direct-current manner via a flexible cable or a contact pin.

On the other hand, as disclosed in, for example, Japanese Patent No. 4325621, a configuration is known in which a feed coil connected to an RFID IC chip is mounted on a control board, and the feed coil is magnetically coupled to a coil antenna provided on an antenna board. With this configuration, a radio-frequency signal can be transmitted from the feed coil to the coil antenna via a magnetic field, and thus the RFID IC chip and the coil antenna can be connected to each other without using a flexible cable or a contact pin.

As in the antenna device disclosed in Japanese Patent No. 4325621, in a case where a feed coil and a coil antenna are magnetically coupled to each other and signals are transmitted accordingly, a mutual inductance is generated between the feed coil and the coil antenna, and thus the impedances or resonance frequencies may be different from each other inconveniently, depending on the positional relationship therebetween. In particular, if the feed coil and the coil antenna are directly and magnetically coupled to each other and if the degree of coupling is extremely high, the resonance points of the feed coil and the coil antenna are separated from each other even if the resonance frequencies of the feed coil and the coil antenna correspond to a carrier frequency. Thus, the signal transmission efficiency from the feed coil to the coil antenna, or the signal transmission efficiency from the coil antenna to the feed coil decreases, and as a result, the communication distance decreases.

SUMMARY OF THE INVENTION

In view of the above-described circumstances, preferred embodiments of the present invention provide an antenna device in which a signal transmission efficiency between a feed coil and a coil antenna is high and a communication distance is long, and a communication terminal apparatus including the antenna device.

An antenna device according to a preferred embodiment of the present invention is an antenna device including a feed coil connected to a feed circuit, and a coil antenna disposed near the feed coil. A magnetic layer is provided between the feed coil and the coil antenna. A product of a relative permeability of a magnetic material of the magnetic layer and a thickness (units of millimeters) of the magnetic layer is less than twenty. The feed coil and the coil antenna are magnetically coupled to each other via the magnetic layer.

A communication terminal apparatus according to another preferred embodiment of the present invention is a communication terminal apparatus including a housing, a feed circuit provided in the housing, a feed coil connected to the feed circuit, and a coil antenna disposed near the feed coil. A magnetic layer is provided between the feed coil and the coil antenna, and the feed coil and the coil antenna are electromagnetically coupled to each other via the magnetic layer.

According to various preferred embodiments of the present invention, a feed coil and a coil antenna are magnetically coupled to each other via a magnetic layer that has an appropriately determined permeability and thickness. Thus, the degree of coupling between the feed coil and the coil antenna can be maintained within an appropriate range. Accordingly, an antenna device having enhanced signal transmission efficiency and an increased communication distance, and a communication terminal apparatus including the antenna device are provided.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 16A is a plan view of an antenna device 108 according to an eighth preferred embodiment of the present invention, FIG. 16B is a partial plan view thereof, and FIG. 16C is a cross-sectional view taken along a C-C portion of FIG. 16B.

DETAILED DESCRIPTION OF THE PREFERRED EMBODIMENTS

Figure 1A:
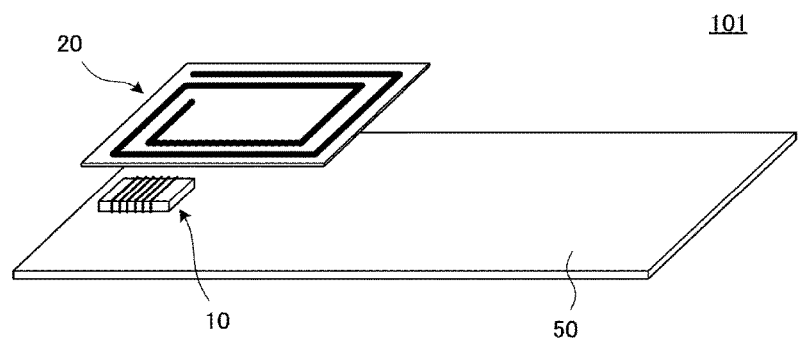
FIG. 1A is a schematic perspective view of an antenna device 101 according to a first preferred embodiment of the present invention.

An antenna device according to various preferred embodiments of the present invention is an antenna device preferably for use in an HF-band RFID system or the like, and includes a feed coil connected to a feed circuit, and a coil antenna disposed near the feed coil. A communication terminal apparatus according to other preferred embodiments of the present invention is a communication terminal apparatus including the foregoing antenna device, and includes a feed circuit provided in a housing, a feed coil connected to the feed circuit, and a coil antenna disposed near the feed coil. In the antenna device and the communication terminal apparatus, a magnetic layer such as a ferrite sheet is disposed between the feed coil and the coil antenna. The feed coil and the coil antenna are magnetically coupled to each other via the magnetic layer.

As described above, the feed coil and the coil antenna are magnetically coupled to each other via the magnetic layer. The magnetic layer is defined so that the product of the relative permeability of the magnetic material of the magnetic layer and the thickness (units of millimeters) of the magnetic layer is less than twenty. Accordingly, even in a case where the feed coil and the coil antenna are disposed close to each other, the degree of coupling (coupling efficiency) does not become extremely high and can be maintained within an appropriate range. This prevents a situation from occurring where the resonance points of the feed coil and the coil antenna are significantly separated from each other. Accordingly, a compact antenna device and communication terminal apparatus can be provided in which impedance matching is achieved between the feed circuit and the antenna device, the transmission efficiency of a radio-frequency signal is high, and the communication distance is long.

Here, the magnetic layer does not completely and magnetically shield the feed coil and the coil antenna, and allows part of magnetic-field components in a carrier frequency to be transmitted therethrough. Thus, in a case where a magnetic layer having a large permeability is used, such as a ferrite sintered body, the thickness of the magnetic layer is preferably small because it is necessary to allow the feed coil and the coil antenna to be magnetically coupled to each other via the magnetic layer. Specifically, the product of the relative permeability and the thickness of the magnetic layer (units of millimeters) is preferably set to be less than twenty. Preferably, the thickness of the magnetic layer is about 300 μm or less, for example. If the thickness is more than about 300 μm, it is difficult that the product of the relative permeability and the thickness of the magnetic layer (units of millimeters) is less than twenty. In addition, a large thickness inhibits a decrease in size of the antenna device.

In various preferred embodiments of the present invention, the feed circuit is a functional circuit that generates a radio-frequency signal and supplies the radio-frequency signal to the coil antenna. In an RFID system, for example, an RFID IC chip corresponds to the feed circuit. The RFID IC chip is a semiconductor integrated circuit including an RF circuit, a memory circuit, a logic circuit, and so forth. The RFID IC chip preferably is a silicon semiconductor element or a GaAs semiconductor element, for example. The semiconductor element may be a bare chip IC or a package IC, for example.

The feed coil includes a coil pattern connected to the feed circuit. The coil pattern is constituted by at least one coil conductor. The coil pattern may be defined by a coil conductor that is wound through a plurality of turns, or only one turn. Alternatively, the coil pattern may be a multilayer coil pattern defined by connecting a plurality of layers of a coil conductor. Alternatively, the feed coil may include a magnetic core constituted by a ferrite sintered body or the like. When transmitting a radio-frequency signal, the feed coil transmits the radio-frequency signal to the coil antenna via a magnetic field. When receiving a radio-frequency signal, the feed coil receives the radio-frequency signal from the coil antenna via a magnetic field.

It is not always necessary that the feed coil and the coil antenna overlap each other, and the feed coil and the coil antenna may be disposed close to each other, in plan view in the direction of the winding axis of the coil antenna. However, it is preferable that one of end portions of the feed coil overlap the outside of the magnetic layer, and that the other end portion overlap the inside of the magnetic layer.

Further, it is preferable that the feed coil be disposed such that the winding axis thereof crosses the winding axis of the coil antenna. More specifically, it is preferable that the feed coil be disposed such that the winding axis of the feed coil is perpendicular or substantially perpendicular to the winding axis of the coil antenna. In particular, in a case where the feed coil is disposed such that at least a portion of the feed coil overlaps a coil conductor constituting the coil antenna, it is preferable that the feed coil be disposed such that the winding axis of the coil antenna is perpendicular or substantially perpendicular to the winding axis of the feed coil in plan view in the direction of the winding axis of the coil antenna. This is because the degree of coupling between the feed coil and the coil antenna with respect to change in the distance therebetween is stabilized.

Further, it is preferable that the feed coil have an inductance value that enables the feed coil and the feed circuit to form a resonance circuit having a resonance frequency corresponding to a carrier frequency. That is, in a case where the feed circuit is an IC chip, it is preferable that the capacitance of the IC chip and the inductance of the feed coil define an LC parallel resonance circuit, and that the resonance frequency thereof be a frequency corresponding to the carrier frequency of a communication signal. In a case where the feed circuit and the feed coil define a resonance circuit that resonates at the carrier frequency, the resonance frequency of the antenna device is easily designed.

In a case where the housing of the communication terminal apparatus includes a principal surface and an end surface connected to an end portion of the principal surface, it is preferable that the feed coil be disposed in the housing near an end portion of the housing such that the winding axis of the feed coil is perpendicular or substantially perpendicular to the end surface of the housing. With this disposition, a magnetic flux easily passes through a coil opening of the feed coil, and the communication distance is increased.

The coil antenna is disposed near the feed coil, and is constituted by at least one coil conductor. The coil conductor may be wound through a plurality of turns, or may include a plurality of layers. Preferably, the coil antenna is a planar coil that includes a first principal surface and a second principal surface. In a case where the coil antenna is a planar coil, the coil antenna can be provided in a small space between the housing and various components provided in the housing. The surfaces of the planar coil may include a plurality of flat surfaces.

In a case where the first principal surface of the planar coil faces an antenna of the communication partner, it is preferable that a magnetic layer be arranged so as to cover the second principal surface. Normally, communication terminal apparatuses such as mobile phones are provided with a metal body having a relatively large area (corresponding to a "conductive layer"), such as a ground conductor of a printed wiring board or a metal cover of a battery. If the coil antenna is disposed near such a metal body, an eddy current flows through the metal body to cancel a change in the magnetic flux generated by the coil antenna. Accordingly, an energy loss (an eddy current loss) increases, and it may become impossible to ensure a sufficient communication distance. Therefore, a magnetic layer is provided between the second principal surface of the planar coil and the metal body, so that the degree of coupling between the planar coil and the feed coil can be controlled, and a decrease in communication distance caused by an eddy current loss can be prevented.

Preferably, the coil antenna is a resonance circuit having a resonance frequency corresponding to the carrier frequency of a communication signal. For example, the coil antenna may be constituted by an LC parallel resonance circuit including a coil conductor having a certain inductance and a chip capacitor having a certain capacitance. Alternatively, a first coil conductor and a second coil conductor may be overlapped with each other with an insulating layer therebetween so that the directions of currents flowing through these conductors are the same, and an LC parallel resonance circuit may be constituted by inductances of the individual coil conductors and a stray capacitance generated between the coil conductors. The coil antenna may also be referred to as a booster antenna, and thus need not always have a resonance frequency corresponding to the carrier frequency of a communication signal. However, if the coil antenna resonates at a frequency corresponding to the carrier frequency, an energy loss decreases, and the communication distance increases.

The coil antenna need not be a planar coil having only one flat surface, and may be a planar coil having at least, for example, a first flat surface and a second flat surface which is connected to the first flat surface. In this case, it is preferable that the feed coil be disposed in a region surrounded by the first flat surface and the second flat surface. In particular, in a case where the housing of the communication terminal apparatus includes a principal surface and an end portion (end surface), it is preferable that the first flat surface be parallel or substantially parallel with the principal surface of the housing and that the second flat surface extend along the end portion (end surface) of the housing to form an angle with the first flat surface. With this configuration, the directivity of the antenna device is increased, and a favorable communication state is ensured between the communication terminal apparatus and an apparatus on the communication partner side even if the communication terminal apparatus faces the antenna on the communication partner side in various directions.

A desirable preferred embodiment of the present invention has been described above. The antenna device and the communication terminal apparatus according to the present invention are not limited to those of the above-described preferred embodiment. For example, the antenna device according to the present invention is not limited to an antenna device for an HF-band RFID system, and may be used for various frequency bands and various communication systems, such as a UHF-band communication system. In the case of using the antenna device as an antenna for an RFID system, the antenna device may be used as an antenna for a reader/writer or an antenna for an RFID tag.

First Preferred Embodiment

Figure 1B:
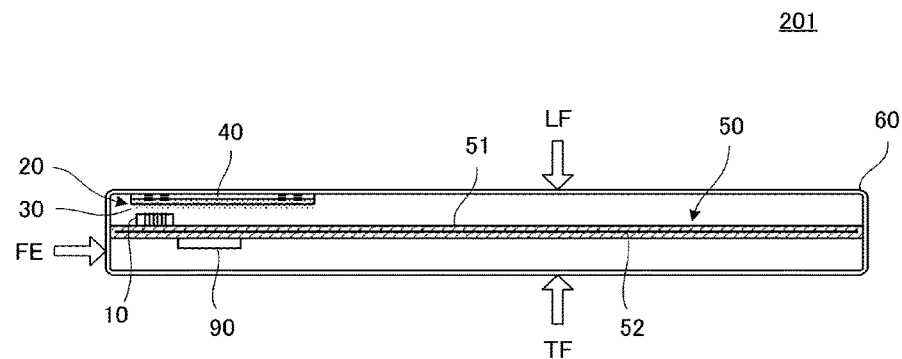
FIG. 1B is a schematic cross-sectional view of a communication terminal apparatus (a mobile communication terminal such as a mobile phone terminal) including the antenna device 101.
Figure 2A:
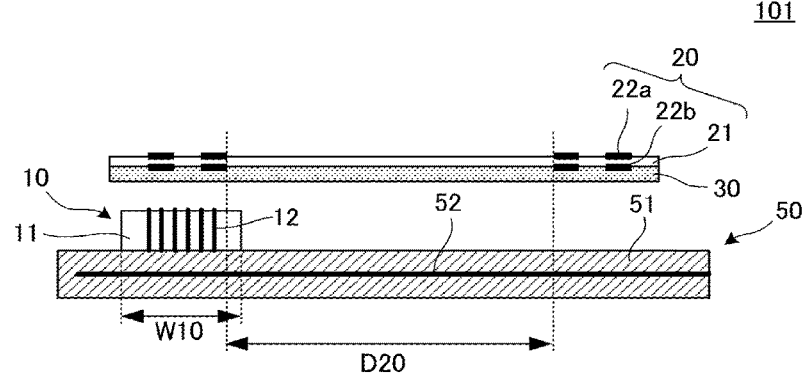
FIG. 2A is a front view of the antenna device 101.
Figure 2B:
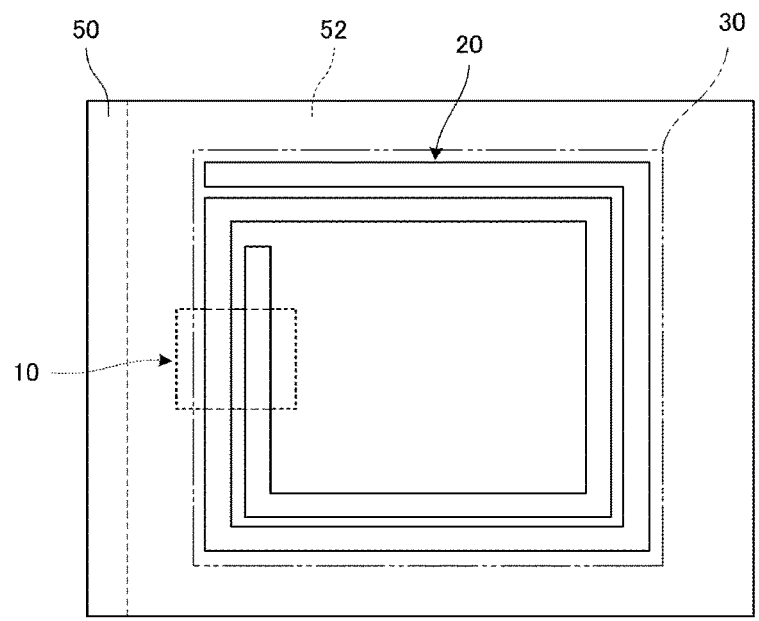
FIG. 2B is a partial plan view of the antenna device 101.

An antenna device and a communication terminal apparatus 201 according to a first preferred embodiment are an antenna device for an HF-band RFID system utilizing a carrier frequency of 13.56 MHz, and a mobile communication terminal including the antenna device mounted therein. FIG. 1A is a schematic perspective view of an antenna device 101 according to the first preferred embodiment, and FIG. 1B is a schematic cross-sectional view of a communication terminal apparatus (a mobile communication terminal such as a mobile phone terminal) including the antenna device. FIG. 2A is a front view of the antenna device 101, and FIG. 2B is a partial plan view of the antenna device 101.

As illustrated in FIG. 1A and FIG. 2A, the antenna device 101 includes a feed coil 10 connected to a feed circuit, a coil antenna 20 disposed near the feed coil 10, and a ferrite sheet 30 provided between the feed coil 10 and the coil antenna 20. In this preferred embodiment, the antenna device 101 further includes a printed wiring board 50. The feed coil 10 is mounted on the printed wiring board 50. The feed coil 10 includes a magnetic core 11 and a coil pattern 12 located on the magnetic core 11. The specific configuration will be described below.

The ferrite sheet 30 preferably has a relative permeability of 50 and a thickness of about 0.3 mm, for example. The product of the relative permeability and the thickness preferably is 15 (less than 20), for example.

As illustrated in FIG. 2A, the coil antenna 20 includes a base sheet 21, a coil conductor 22a located on the upper surface of the base sheet 21, and a coil conductor 22b located on the lower surface of the base sheet 21.

As illustrated in FIG. 1B, the communication terminal apparatus 201 includes a terminal housing 60, which is rectangular or substantially rectangular parallelepiped shaped. The antenna device 101 is provided in the terminal housing 60. An RFID IC chip 90 and the feed coil 10 are disposed near an end portion of the printed wiring board 50. The RFID IC chip 90 is connected to the feed coil 10.

On an inner surface on a back surface LF side of the terminal housing 60, the coil antenna 20 is adhered via a binder 40, such as a double-sided adhesive sheet.

The printed wiring board 50 preferably is made of a thermosetting resin, such as epoxy resin, and the planar shape thereof preferably is rectangular or substantially rectangular. The printed wiring board 50 includes a substrate 51 and various conductive patterns. A ground conductor 52, which preferably has the same or substantially the same shape as the planar shape of the printed wiring board 50, is provided in an inner layer of the substrate 51. The ground conductor 52 functions as a ground electrode of various electronic components (not illustrated) included in the communication terminal, such as a radio-frequency circuit, a power supply circuit, and a liquid crystal driving circuit.

Figure 3:
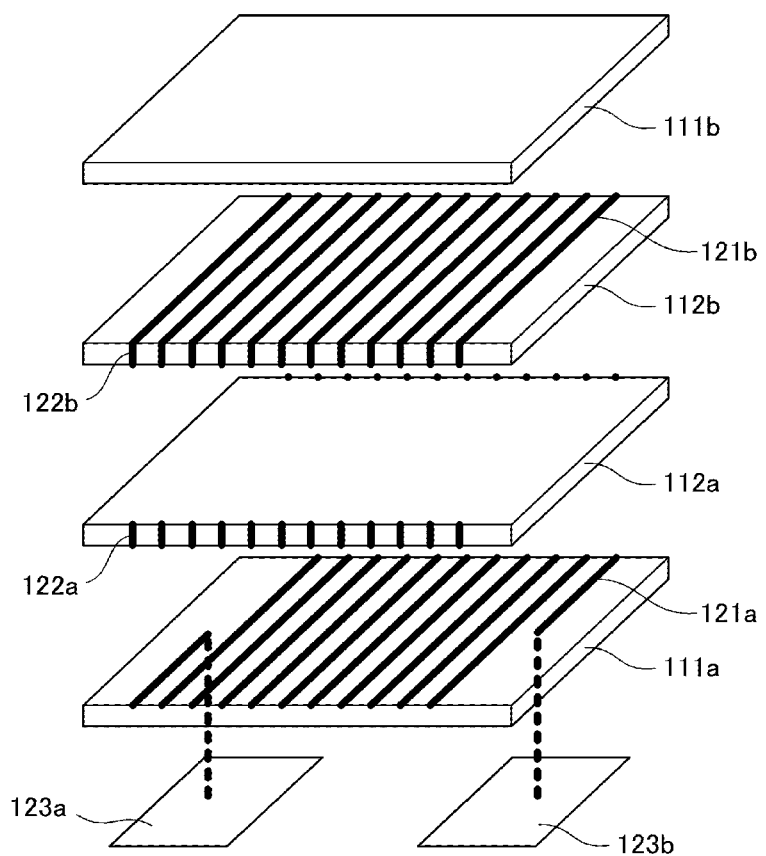
FIG. 3 is an exploded perspective view of a feed coil 10.

FIG. 3 is an exploded perspective view of the feed coil 10. The feed coil 10 includes a magnetic core including a ferrite sintered body, and a coil pattern wound around the magnetic core. Specifically, as illustrated in FIG. 3, the magnetic core includes a magnetic layer 112a and a magnetic layer 112b. The base body of the feed coil 10 has a multilayer structure in which the magnetic layers 112a and 112b are sandwiched between non-magnetic layers 111a and 111b. An in-plane conductor 121a, which is a portion of the coil pattern, is provided on the non-magnetic layer 111a. An in-plane conductor 121b, which is a portion of the coil pattern, is located on the magnetic layer 112b. End-surface conductors 122a and 122b, each being a portion of the coil pattern, are provided on both end surfaces of the magnetic layers 112a and 112b. Input/output terminals 123a and 123b are provided on the lower surface of the non-magnetic layer 111a. Via-hole conductors that electrically connect the in-plane conductor 121a and the input/output terminals 123a and 123b are provided on the non-magnetic layer 111a. The end-surface conductors 122a and 122b correspond to half of a through-hole conductor or a via-hole conductor having an inner surface on which a conductive film is formed in the state of a motherboard.

As described above, the in-plane conductors 121a and 121b and the end-surface conductors 122a and 122b define the coil pattern of the feed coil 10.

The magnetic layers 112a and 112b, and the non-magnetic layers 111a and 111b preferably are ferrite ceramic sintered layers. The in-plane conductors 121a and 121b, and the end-surface conductors (through-hole conductor, via-hole conductor) 122a and 122b preferably are sintered bodies of a conductive material mainly containing silver, copper, or the like printed on or filled in a ceramic green sheet, which is a precursor of a ceramic sintered layer.

As described above, the feed coil 10 preferably is a chip component including a multilayer structure serving as a base body, and is mounted on the surface of the printed wiring board 50 via the input/output terminals 123a and 123b. As illustrated in FIG. 2B, the feed coil 10 is mounted on the surface of the printed wiring board 50 such that the coil pattern of the feed coil 10 overlaps the coil conductors constituting the coil antenna 20 in plan view in the direction of the winding axis of the coil antenna 20.

Figure 4:
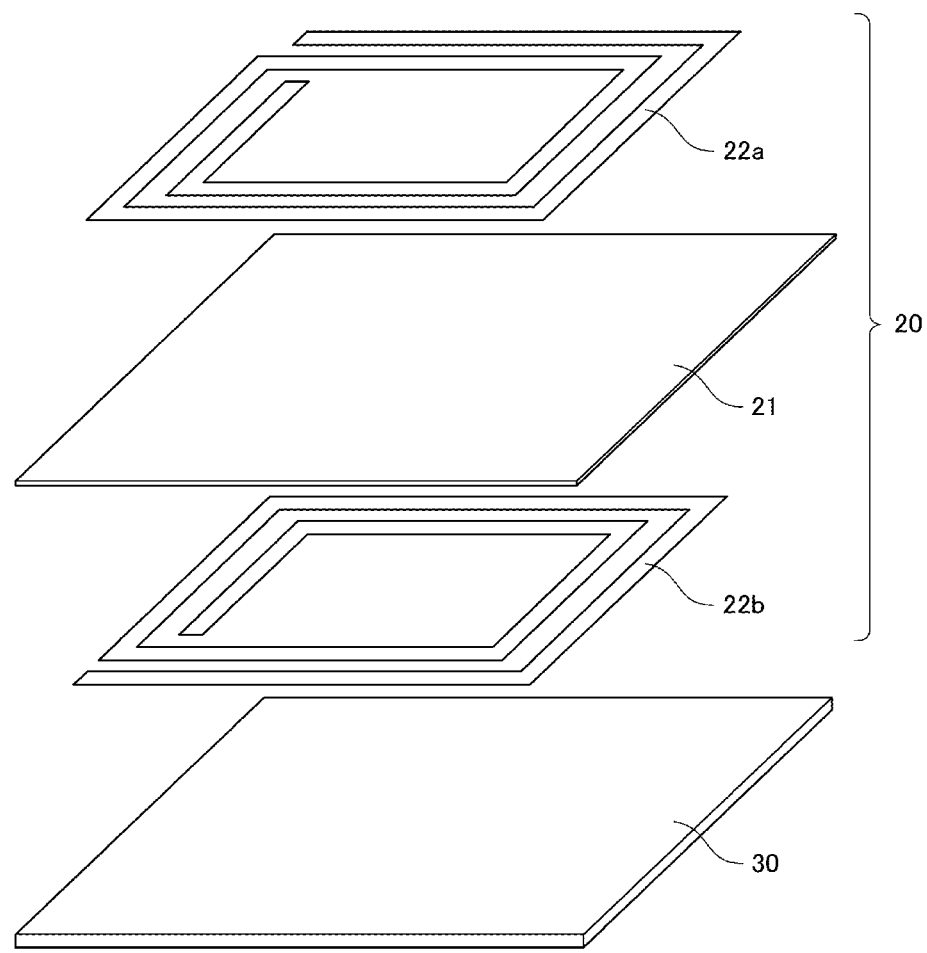
FIG. 4 is an exploded perspective view of a coil antenna 20 and a ferrite sheet 30.

FIG. 4 is an exploded perspective view of the coil antenna 20 and the ferrite sheet 30. The coil antenna 20 is constituted by the base sheet 21, which is preferably made of PET or the like, the coil conductor 22a located on the upper surface of the base sheet 21, and the coil conductor 22b located on the lower surface of the base sheet 21. The coil conductors 22a and 22b are thin metal films, such as copper foil or aluminum foils. In this preferred embodiment, the coil antenna 20 is a planar coil constituted by the base sheet 21 and the coil conductors 22a and 22b. In FIG. 4, the surface on the upper side is a first principal surface oriented toward an antenna on the communication partner side, and the surface on the lower side is a second principal surface opposite thereto.

The coil conductor 22a and the coil conductor 22b are patterns that are wound so that, when currents flow from one ends of the respective coil conductors toward the other ends, the directions in which the currents flow in the respective coil conductors are the same. The coil conductors 22a and 22b are disposed such that at least portions of the coil conductors 22a and 22b overlap each other in plan view in the direction of the winding axes thereof. As a result, these coil conductors 22a and 22b are coupled to each other via a capacitance.

As illustrated in FIG. 1B, the ferrite sheet 30 is provided between the coil antenna 20 and the ground conductor 52, and also between the coil antenna 20 and the feed coil 10. The feed coil 10 and the coil antenna 20 are disposed such that the winding axis of the feed coil 10 is perpendicular or substantially perpendicular to the winding axis of the coil antenna 20, that the feed coil 10 and the coil antenna 20 partially overlap each other in plan view of the coil antenna 20, and that two opening portions (both end portions) of the feed coil 10 protrude from a region where the conductors of the coil antenna 20 are provided. With such disposition, the degree of coupling between the feed coil 10 and the coil antenna 20 increases, and stable communication characteristics are obtained even if the distance between the coil antenna 20 and the feed coil 10 increases.

Figure 5A:
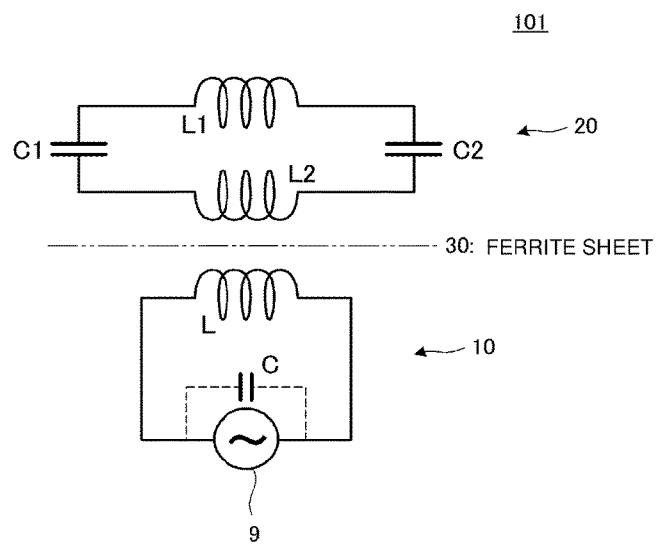
FIG. 5A is an equivalent circuit diagram illustrating a state where a feed circuit 9 is connected to the antenna device 101.

FIG. 5A is an equivalent circuit diagram illustrating a state where a feed circuit 9 is connected to the antenna device 101. On a feed side including the feed circuit 9 and the feed coil 10, a capacitance C composed of a stray capacitance of the RFID IC chip and a matching capacitor, and an inductance L of the feed coil 10 define an LC parallel resonance circuit. The resonance frequency of the LC parallel resonance circuit is set to be equal or substantially equal to the carrier frequency of a communication signal (13.56 MHz). On an antenna side including the coil antenna 20, an inductance L1 of the coil conductor 22a, an inductance L2 of the coil conductor 22b, and capacitances C1 and C2 generated between the coil conductor 22a and the coil conductor 22b define an LC parallel resonance circuit. The resonance frequency of the LC parallel resonance circuit is set to be equal or substantially equal to the carrier frequency of a communication signal (13.56 MHz). The feed coil 10 and the coil antenna 20 are magnetically coupled to each other via the ferrite sheet 30. That is, the feed coil 10 and the coil antenna 20 are magnetically coupled to each other by a weak mutual inductance via the ferrite sheet 30.

Figure 5B:
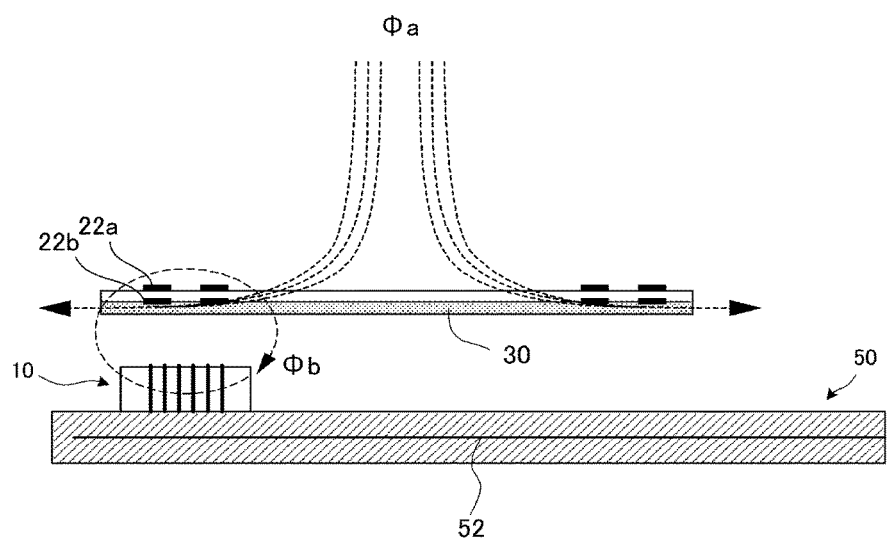
FIG. 5B is a diagram illustrating an induction magnetic field that is formed between the coil antenna 20 and an antenna on the communication partner side.

FIG. 5B is a diagram illustrating an induction magnetic field that is generated between the coil antenna 20 and an antenna on the communication partner side (not illustrated). The major portion of the induction magnetic field that is generated between the coil antenna 20 and the antenna on the communication partner side is induced along an upper-side interface of the ferrite sheet 30, as represented by a magnetic flux $\phi a$. A portion of the induction magnetic field is induced to the feed coil 10 via the ferrite sheet 30, as represented by a magnetic flux $\phi b$. Since the ferrite sheet 30 exists between the coil antenna 20 and the ground conductor 52, the occurrence of an eddy current in the ground conductor 52 caused by the induction magnetic field of the current flowing through the coil antenna 20 is minimized or prevented.

Figure 6A:
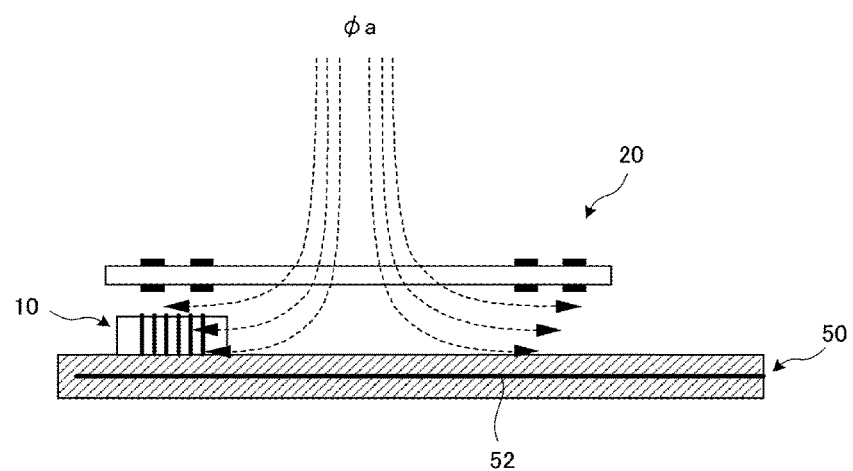
FIG. 6A and FIG. 6B are diagrams each illustrating an induction magnetic field of an antenna device which is a target compared to the antenna device according to a preferred embodiment of the present invention.
Figure 6B:
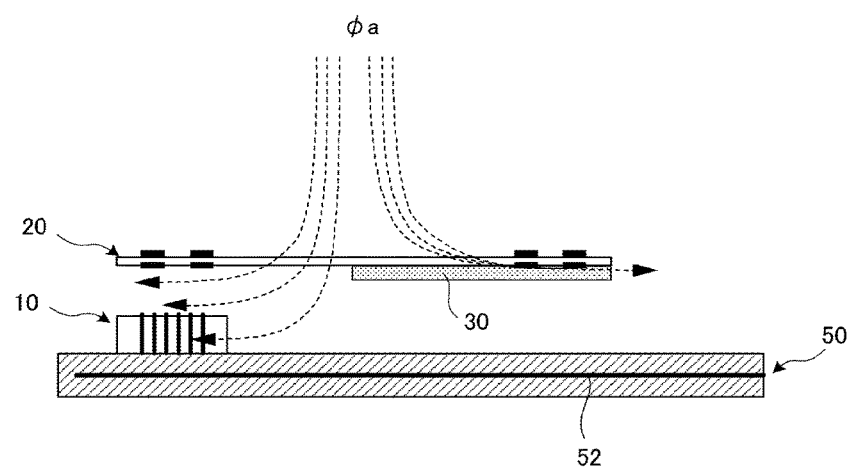

FIG. 6A and FIG. 6B are diagrams each illustrating an induction magnetic field of an antenna device which is a target compared to the antenna device according to a preferred embodiment of the present invention. FIG. 6A illustrates an example of an antenna device not including a ferrite sheet, and FIG. 6B illustrates an example of an antenna device including a ferrite sheet that is arranged so as not to overlap the feed coil 10.

In the antenna device illustrated in FIG. 6A, there is not a ferrite sheet between the coil antenna 20 and the ground conductor 52, and thus an eddy current flows through the ground conductor 52 due to the induction magnetic field of the current flowing through the coil antenna 20, and an eddy current loss occurs. Further, the coil antenna 20 is directly adjacent to the feed coil 10 and the degree of coupling therebetween is high, but the resonance frequency of the coil antenna 20 is separated from the resonance frequency of the feed coil 10 (resonance points are separated from each other), and accordingly a transmission loss of signal energy increases.

In the antenna device illustrated in FIG. 6B, there is the ferrite sheet 30 in a portion between the coil antenna 20 and the ground conductor 52, and thus the occurrence of an eddy current loss can be suppressed or prevented compared to the antenna device illustrated in FIG. 6A. However, the occurrence of an eddy current loss is inevitable in a portion that is not covered by the ferrite sheet 30. Also, like the antenna device illustrated in FIG. 6A, there is a problem of a transmission loss of signal energy caused by separate resonance points.

FIGS. 7A-7D are diagrams illustrating changes in resonance frequencies of the coil antenna and the feed coil in the structure of the antenna device 101 according to the first preferred embodiment in a case where the thickness of the ferrite sheet 30 is changed. The conditions under which the results illustrated in FIG. 7A to FIG. 7D are obtained are as follows.

Ferrite Sheet {(A) to (D) correspond to FIG. 7A to FIG. 7D}

(A) Real part permeability $\mu'=70$, thickness $\delta=50$ μm [the product of relative permeability of the magnetic material and the thickness (units of millimeters)=3.5]

(B) Real part permeability $\mu'=70$, thickness $\delta=100$ μm [the product of relative permeability of the magnetic material and the thickness (units of millimeters)=7]

(C) Real part permeability $\mu'=70$, thickness $\delta=500$ μm [the product of relative permeability of the magnetic material and the thickness (units of millimeters)=35]

(D) No ferrite sheet

Feed Coil

Inductance 0.74 μH

Coil Antenna

Planar dimension: 40 mm×40 mm

Thickness: 100 μm

RFID IC Chip

PN-544 manufactured by NXP Semiconductors

Reader/Writer

VIVO5000 manufactured by VIVOtech

In FIG. 7A to FIG. 7D, a curve s represents frequency characteristics of the feed coil 10 alone, and a curve d represents frequency characteristics in a state where the feed coil 10 and the coil antenna 20 are coupled to each other. The frequency characteristics of the coil antenna 20 alone are equivalent to those represented by the curve s.

Figure 7A:
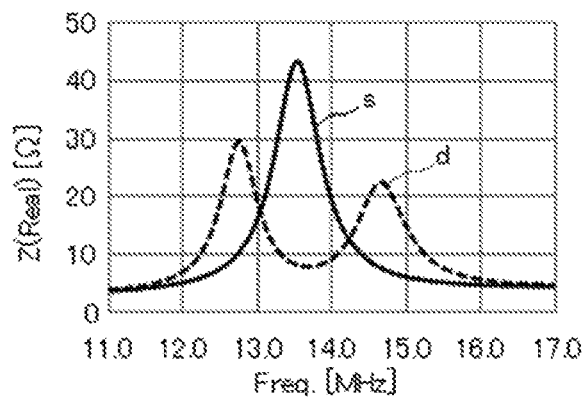
FIGS. 7A-7D are diagrams illustrating changes in resonance frequencies of the coil antenna and the feed coil in a case where the thickness of the ferrite sheet 30 is changed.
Figure 7B:
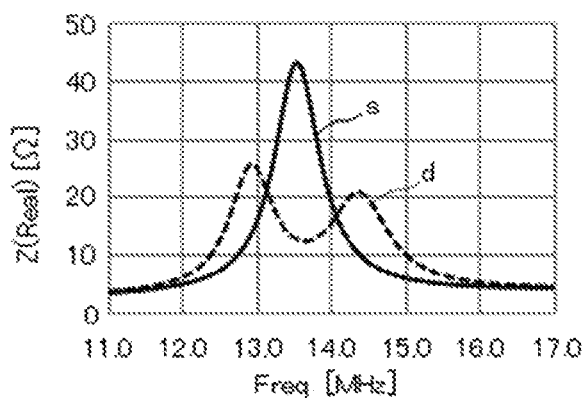
Figure 7C:
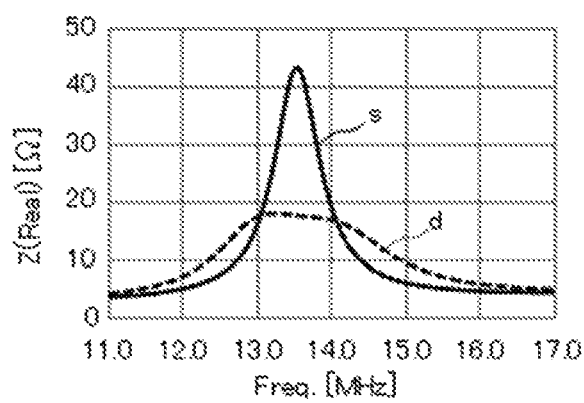
Figure 7D:
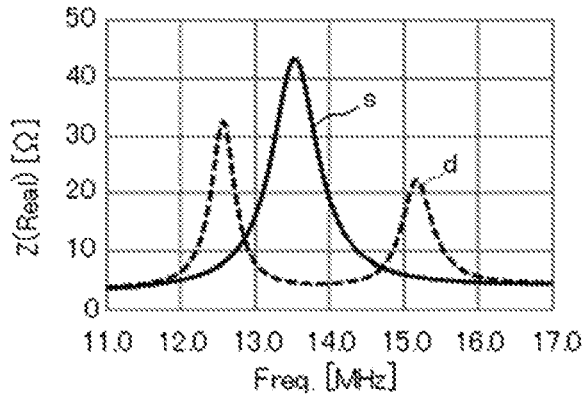

In the examples illustrated in FIG. 7A and FIG. 7B, the coupling between the feed coil 10 and the coil antenna 20 breaks degeneracy and causes the resonance points to be separated from each other, but the maximum communication distance is 37 mm. In contrast, in the example illustrated in FIG. 7C, the feed coil 10 and the coil antenna 20 are not coupled to each other, and the maximum communication distance is only about 25 mm, for example. Also, as illustrated in FIG. 7D, in a case where no ferrite sheet is provided, the coupling between the feed coil 10 and the coil antenna 20 significantly breaks degeneracy and causes the resonance points to be significantly separated from each other. Furthermore, an eddy current loss occurs in the ground conductor 52, and thus the maximum communication distance is about 20 mm, for example.

In the first preferred embodiment, as illustrated in FIG. 5B and so forth, the feed coil 10 and the coil antenna 20 are disposed such that the winding axis of the feed coil 10 is perpendicular or substantially perpendicular to the winding axis of the coil antenna 20, that the feed coil 10 and the coil antenna 20 partially overlap each other in plan view of the coil antenna 20, and that the opening portions (end portions) of the feed coil 10 protrude from the region where the conductors of the coil antenna 20 are provided. Accordingly, even if the distance between the coil antenna 20 and the feed coil 10 is large, the relationship in which the magnetic flux $\phi a$ is interlinked with the coil antenna 20 and the magnetic flux $\phi b$ is interlinked with the feed coil 10 is maintained, and stable communication characteristics are obtained.

As illustrated in FIG. 2A, the ground conductor (conductive layer) 52 is arranged so as to sandwich, with the coil antenna 20, the feed coil 10. The ground conductor 52 extends along the winding axis of the coil pattern 12 of the feed coil 10. The ground conductor 52 is disposed so as to cover the feed coil 10 and such that at least a portion of the ground conductor 52 is positioned inside the inner peripheries of the coil conductors of the coil antenna 20 in plan view. In FIG. 2A, W10 represents the width of the feed coil 10, and D20 represents the inner peripheries of the coil conductors of the coil antenna 20.

With the above-described configuration, the magnetic flux generated by the coil antenna 20 is along the ground conductor 52, and the magnetic flux is easily interlinked with the feed coil 10. Thus, the existence of the ground conductor 52 increases the degree of coupling between the feed coil 10 and the coil antenna 20. This configuration is effective in the case of increasing the degree of coupling between the feed coil 10 and the coil antenna 20 even if the size of the feed coil 10 is particularly small, or if the distance between the feed coil 10 and the coil antenna 20 is relatively large.

Second Preferred Embodiment

Figure 8A:
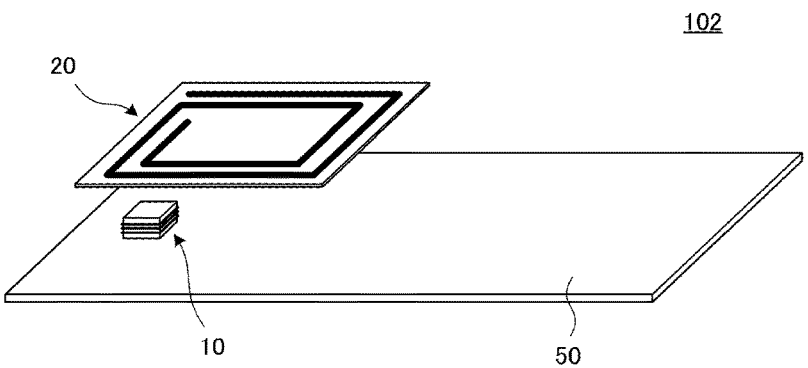
FIG. 8A is a schematic perspective view of an antenna device 102 according to a second preferred embodiment of the present invention.
Figure 8B:
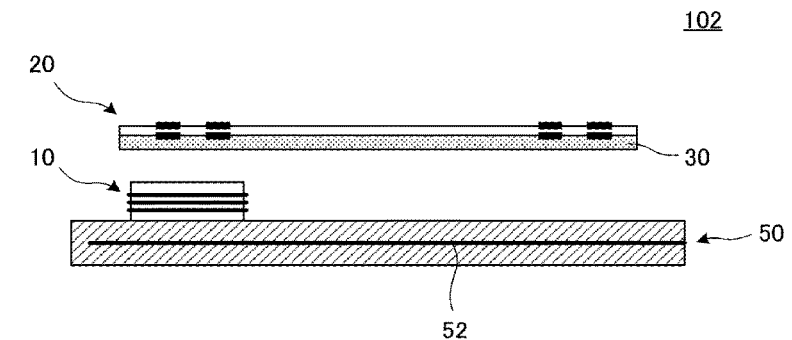
FIG. 8B is a front view of the antenna device 102.

FIG. 8A is a schematic perspective view of an antenna device 102 according to a second preferred embodiment of the present invention, and FIG. 8B is a front view of the antenna device 102. In the second preferred embodiment, the feed coil 10 is mounted on the printed wiring board 50 such that the direction of the winding axis of the feed coil 10 is the same as the direction of the winding axis of the coil antenna 20. The configuration of the antenna device 102 is the same as the configuration of the antenna device 101 according to the first preferred embodiment except that the mount position of the feed coil 10 is different.

The antenna device 102 according to the second preferred embodiment is capable of ensuring a communication distance that is equivalent or substantially equivalent to that of the antenna device 101 according to the first preferred embodiment. However, if the distance between the feed coil 10 and the coil antenna 20 increases, or the positional relationship therebetween changes, or if the resonance frequency of the coil antenna 20 varies, the resonance frequency of the antenna device 102 may fluctuate.

Third Preferred Embodiment

Figure 9A:
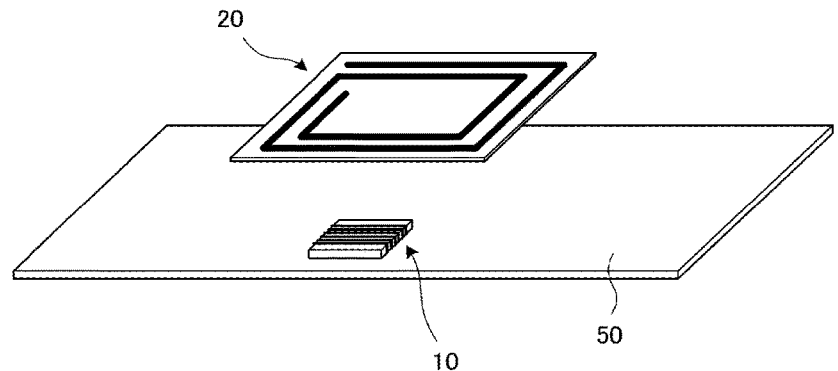
FIG. 9A is a schematic perspective view of an antenna device 103 according to a third preferred embodiment of the present invention.
Figure 9B:
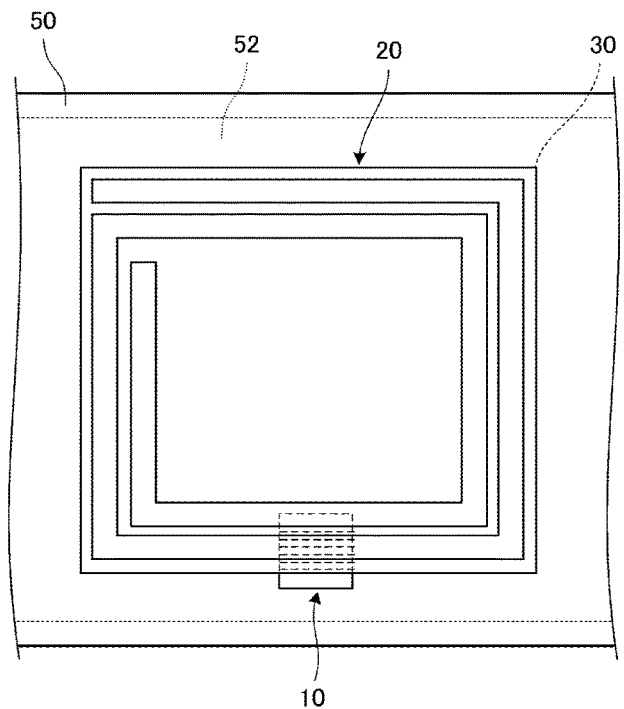
FIG. 9B is a partial plan view of the antenna device 103.
Figure 10A:
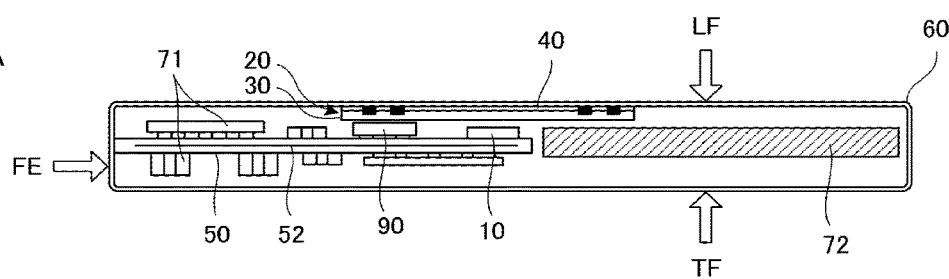
FIG. 10A is a schematic cross-sectional view of a communication terminal apparatus 203 including the antenna device 103.
Figure 10B:
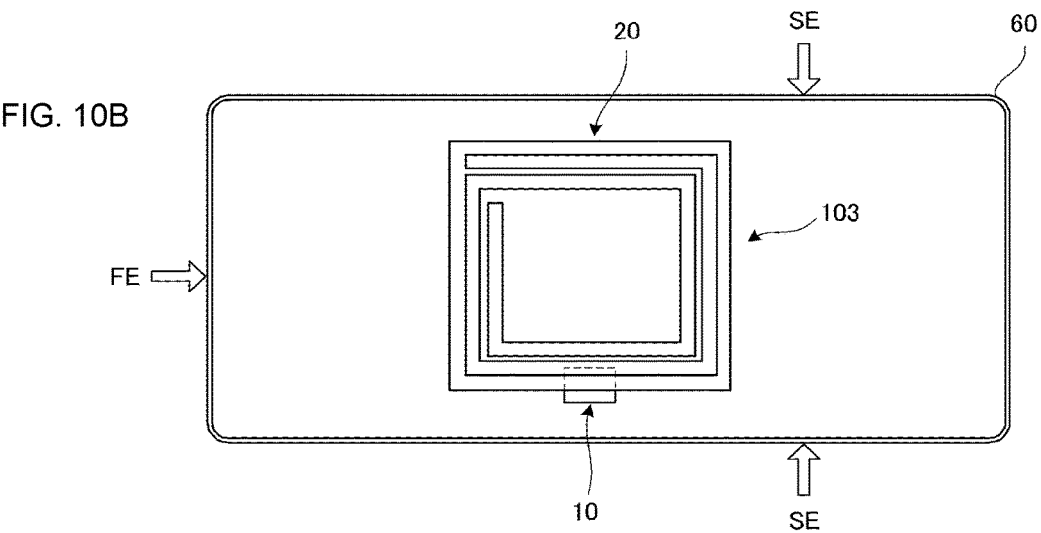
FIG. 10B is a plan view of the antenna device 103 included in the communication terminal apparatus 203.

FIG. 9A is a schematic perspective view of an antenna device 103 according to a third preferred embodiment of the present invention, and FIG. 9B is a partial plan view of the antenna device 103. FIG. 10A is a schematic cross-sectional view of a communication terminal apparatus 203 including the antenna device 103. FIG. 10B is a plan view of the antenna device 103 included in the communication terminal apparatus 203.

In the antenna device 103 and the communication terminal apparatus 203 according to the third preferred embodiment, the coil antenna 20 is disposed at or substantially at the center of the terminal housing 60 when viewed from the back surface LF of the terminal housing 60. The feed coil 10 is disposed such that the coil opening surface thereof is close to a side edge portion SE of the terminal housing 60. Accordingly, even if the coil antenna 20 is disposed at or substantially at the center of the terminal housing 60, the magnetic flux passing through the feed coil 10 can be caused to go around in the direction of the side edge portion SE of the terminal housing 60. That is, during transmission, the magnetic flux from the feed coil 10 goes around in the direction of the side edge portion SE. During reception, the magnetic flux from the communication partner is oriented in the direction of the side edge portion SE so as to mainly avoid the printed wiring board 50. Thus, for example, in a case where metal bodies such as various electronic components 71 and a battery pack 72 are disposed in the direction perpendicular or substantially perpendicular to the direction of the side edge portion SE, collision of the magnetic flux passing through the feed coil 10 with the metal bodies is significantly reduced or prevented. Accordingly, a decrease in communication distance is prevented.

In the communication terminal apparatus 203, the various electronic components 71, which constitute the communication terminal apparatus 203, are mounted as surface mount components on the printed wiring board 50 disposed in the terminal housing 60. Also, the battery pack 72 is disposed near the coil antenna 20. On the second principal surface side of the coil antenna 20, the ferrite sheet 30 is adhered to the entire second principal surface of the coil antenna 20. Thus, even if metal bodies other than the ground conductor 52 (for example, the various electronic components 71 and the battery pack 72) are disposed near the coil antenna 20, an eddy current loss due to these metal bodies is less likely to occur. For a similar reason, the amount of variation of the resonance frequency of the coil antenna 20 is small.

Fourth Preferred Embodiment

Figure 11A:
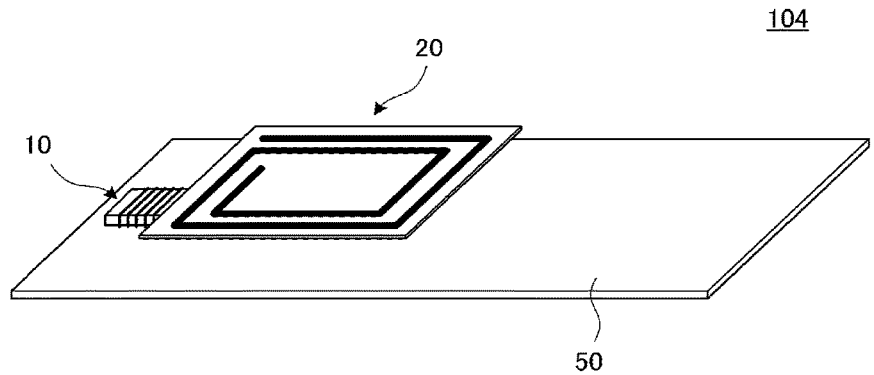
FIG. 11A is a schematic perspective view of an antenna device 104 according to a fourth preferred embodiment of the present invention.
Figure 11B:
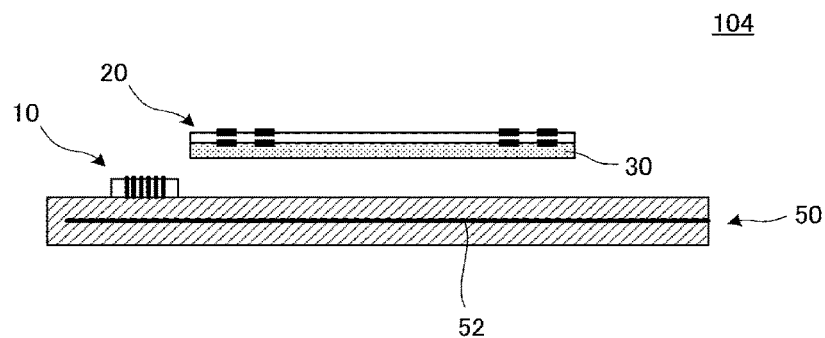
FIG. 11B is a front view of the antenna device 104.

FIG. 11A is a schematic perspective view of an antenna device 104 according to a fourth preferred embodiment of the present invention, and FIG. 11B is a front view of the antenna device 104. In the antenna device 104 according to the fourth preferred embodiment, the feed coil 10 is disposed so as not to overlap the ferrite sheet 30 in plan view in the direction of the winding axis of the coil antenna 20. Also in this case, the feed coil 10 is disposed on the opposite side of the coil antenna 20 with respect to the flat surface including the ferrite sheet 30, so that the feed coil 10 and the coil antenna 20 are magnetically coupled to each other via the ferrite sheet 30. That is, the feed coil 10 and the coil antenna 20 are magnetically coupled to each other via the magnetic flux that has been transmitted through the ferrite sheet 30.

Fifth Preferred Embodiment

Figure 12A:
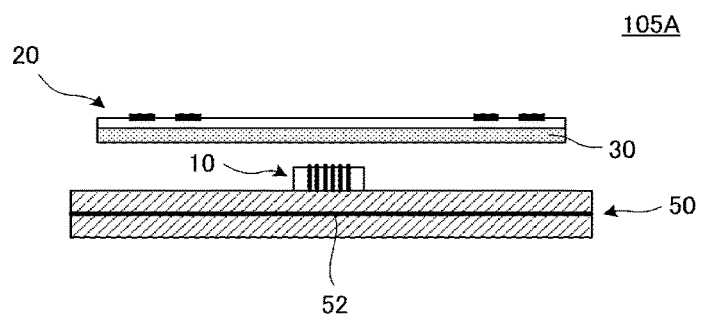
FIG. 12A is a schematic perspective view of an antenna device 105A according to a fifth preferred embodiment of the present invention.
Figure 12B:
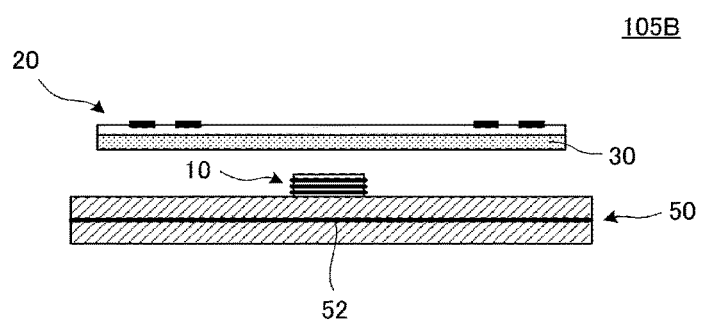
FIG. 12B is a schematic perspective view of an antenna device 105B according to the fifth preferred embodiment of the present invention.
Figure 12C:
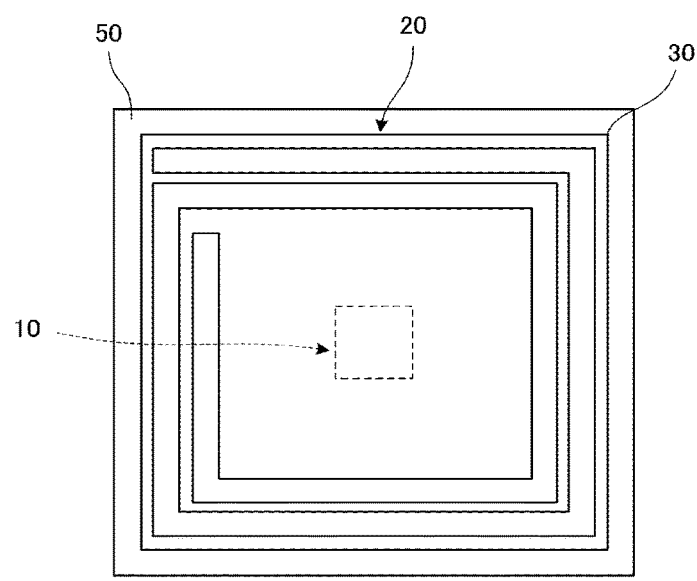
FIG. 12C is a partial plan view of the antenna devices 105A and 105B.

FIG. 12A is a schematic perspective view of an antenna device 105A according to a fifth preferred embodiment of the present invention, FIG. 12B is a schematic perspective view of an antenna device 105B according to the fifth preferred embodiment, and FIG. 12C is a partial plan view of the antenna devices 105A and 105B. In the antenna devices 105A and 105B according to the fifth preferred embodiment, in plan view in the direction of the winding axis of the coil antenna 20, the feed coil 10 is disposed at or substantially at the center of the coil opening of the coil antenna 20. The feed coil 10 may be disposed such that the winding axis of the feed coil 10 is perpendicular or substantially perpendicular to the winding axis of the coil conductors of the coil antenna 20, as illustrated in FIG. 12A, or may be disposed such that the winding axis of the feed coil 10 is parallel or substantially parallel with the winding axis of the coil conductors of the coil antenna 20, and also that both the winding axes match each other, as illustrated in FIG. 12B.

Sixth Preferred Embodiment

Figure 13:
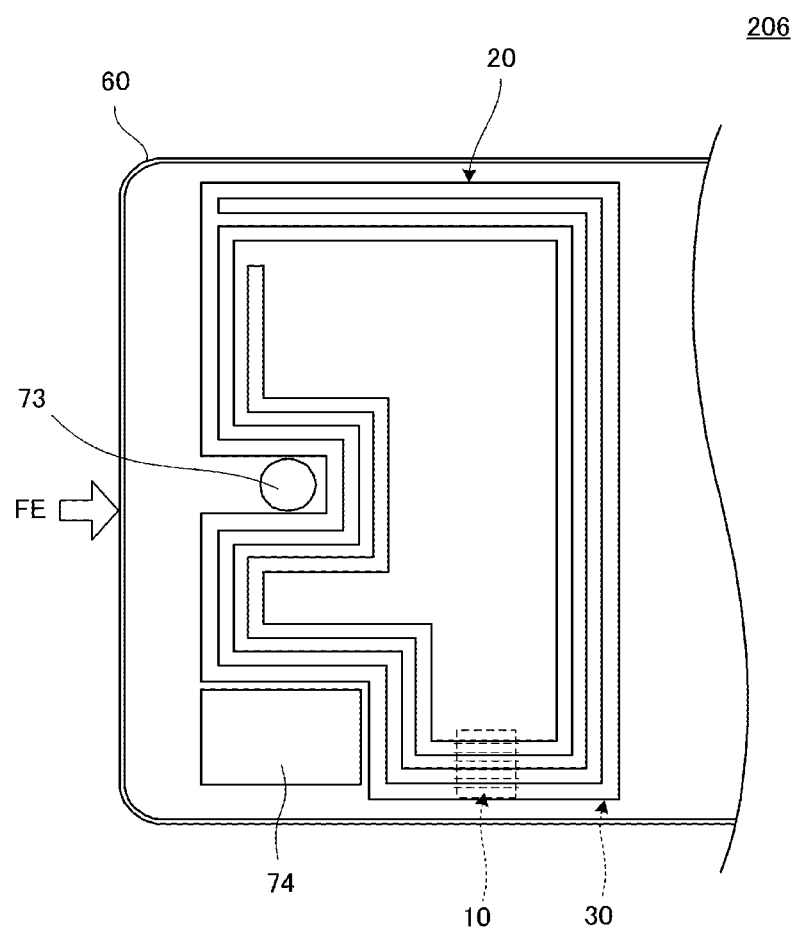
FIG. 13 is a partial plan view of a communication terminal apparatus 206 including an antenna device according to a sixth preferred embodiment of the present invention.

FIG. 13 is a partial plan view of a communication terminal apparatus 206 including an antenna device according to a sixth preferred embodiment of the present invention. In the communication terminal apparatus 206, the coil antenna 20 and the ferrite sheet 30 are disposed so as not to overlap a camera module 73 and a speaker 74.

In this way, it is not necessary that the outer shapes of the coil antenna 20 and the ferrite sheet 30 be rectangular or substantially rectangular. The coil antenna 20 and the ferrite sheet 30 may have a recessed portion or a protruded portion.

Seventh Preferred Embodiment

Figure 14A:
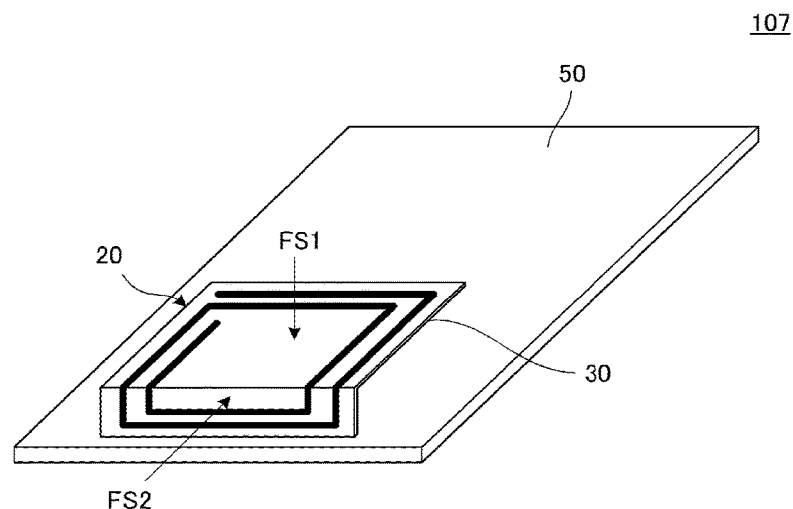
FIG. 14A is a schematic perspective view of an antenna device 107 according to a seventh preferred embodiment of the present invention.
Figure 14B:
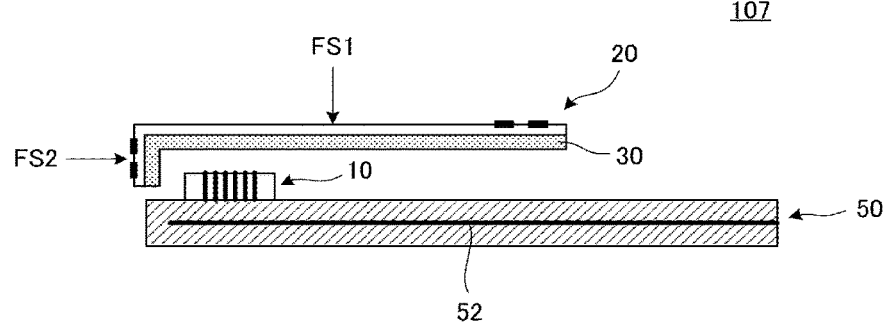
FIG. 14B is a front view of the antenna device 107.
Figure 15A:
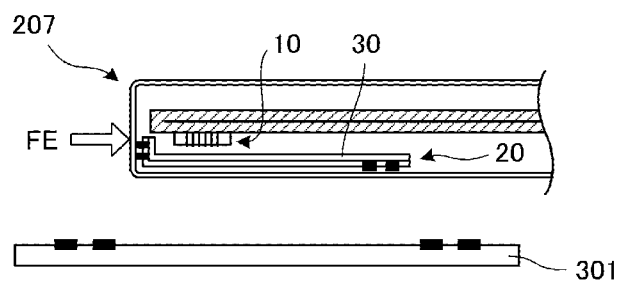
FIGS. 15A-15C are diagrams each illustrating the angle formed by a communication terminal apparatus 207 including the antenna device 107 and a coil antenna on the communication partner side.
Figure 15B:
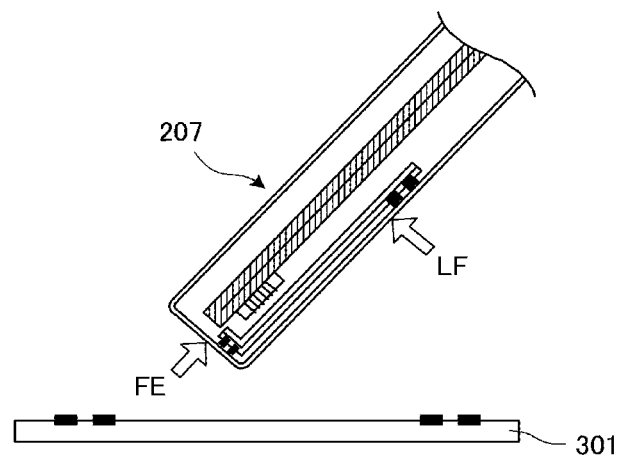
Figure 15C:
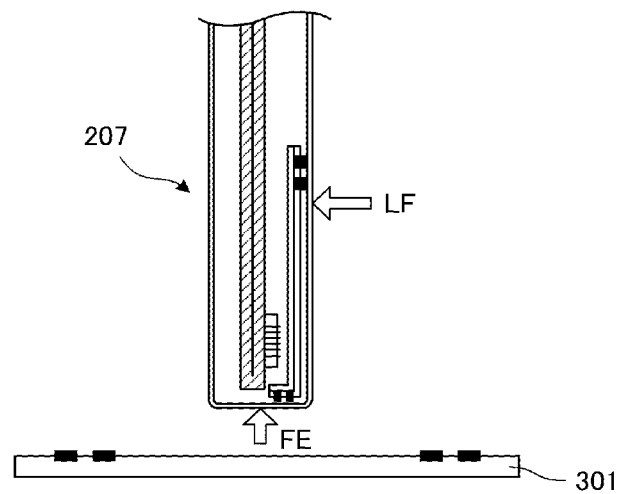

FIG. 14A is a schematic perspective view of an antenna device 107 according to a seventh preferred embodiment of the present invention, and FIG. 14B is a front view of the antenna device 107. FIGS. 15A-15C are diagrams each illustrating the angle formed by a communication terminal apparatus 207 including the antenna device 107 and a coil antenna on the communication partner side.

In the antenna device 107, as illustrated in FIG. 14A and FIG. 14B, the coil antenna 20 is a planar coil including a first flat surface FS1 and a second flat surface FS2 that is connected to the first flat surface FS1. Also, the ferrite sheet 30 includes a first flat surface FS1 and a second flat surface FS2, and is arranged so as to cover the coil conductors of the coil antenna 20 and the opening surface thereof. The feed coil 10 is disposed in a region surrounded by the first flat surfaces FS1 and the second flat surfaces FS2 of the coil antenna 20 and the ferrite sheet 30. The first flat surface FS1 is parallel or substantially parallel with the principal surface of the terminal housing 60, and the second flat surface FS2 extends along the plane of an end FE of the terminal housing 60 to form an angle with the first flat surface FS1.

With this configuration, communication can be performed in any of the following cases: a case where the principal surface of the terminal housing 60 is parallel or substantially parallel with the coil opening surface of a coil antenna 301 on the communication partner side, as illustrated in FIG. 15A; a case where the principal surface of the terminal housing 60 and the coil opening surface of the coil antenna 301 on the communication partner side form an angle of approximately 45 degrees, as illustrated in FIG. 15B; and a case where the principal surface of the terminal housing 60 and the coil opening surface of the coil antenna 301 on the communication partner side form an angle of approximately 90 degrees, as illustrated in FIG. 15C.

In this preferred embodiment, the angle formed between the first flat surface FS1 and the second flat surface FS2 preferably is approximately 90 degrees. Alternatively, the angle may be an obtuse angle of about 120 degrees, or may be an acute angle of about 45 degrees, for example. Alternatively, instead of using a configuration in which the first flat surface FS1 and the second flat surface FS2 are arranged with a certain angle formed therebetween, the first flat surface FS1 and the second flat surface FS2 may be connected to each other via a curved surface, or the portion corresponding to the first flat surface FS1 and the second flat surface FS2 may be defined by a single curved surface.

Eighth Preferred Embodiment

FIG. 16A is a plan view of an antenna device 108 according to an eighth preferred embodiment of the present invention, FIG. 16B is a partial plan view thereof, and FIG. 16C is a cross-sectional view taken along a C-C portion of FIG. 16B. In the antenna device 108, in plan view in the direction of the winding axis of the coil conductors of the coil antenna 20, the feed coil 10 is disposed outside the region where the coil conductors 22 (22a and 22b) of the coil antenna 20 are provided. Note that an extended portion 22E is provided at a portion of outer edges of the coil conductors 22 (22a and 22b), and the feed coil 10 is disposed at a position that overlaps the extended portion 22E. Also, the ferrite sheet 30 is extended so as to overlap the extended portion 22E.

In a case where the feed coil 10 is disposed outside the coil conductors 22 (22a and 22b), the degree of coupling between the feed coil 10 and the coil antenna 20 may become too small. It is preferable that, as in this preferred embodiment, an extended portion be provided at a portion of the coil antenna 20 and a portion of the ferrite sheet 30 so as to overlap the feed coil 10.

Ninth Preferred Embodiment

In a ninth preferred embodiment of the present invention, a description will be given of the relationship between the permeability and thickness of a magnetic layer and the communication distance.

Figure 17A:
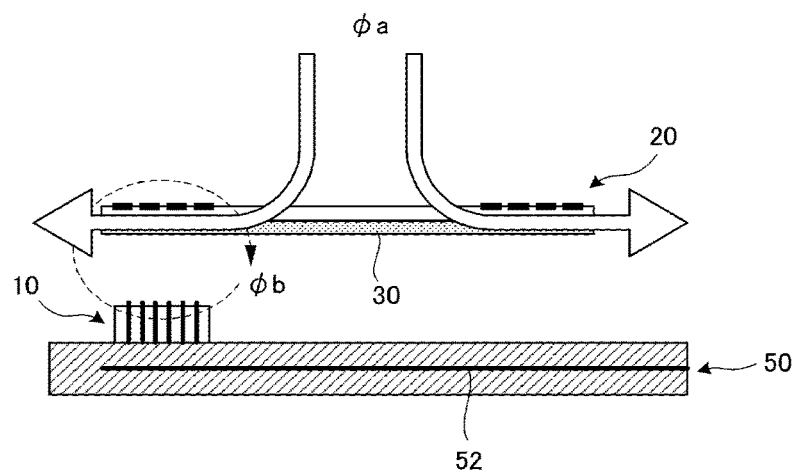
FIG. 17A is a diagram illustrating the induction magnetic field of the antenna device in a case where the permeability of the ferrite sheet 30 (magnetic layer) is high, or in a case where the thickness of the ferrite sheet 30 is large.
Figure 17B:
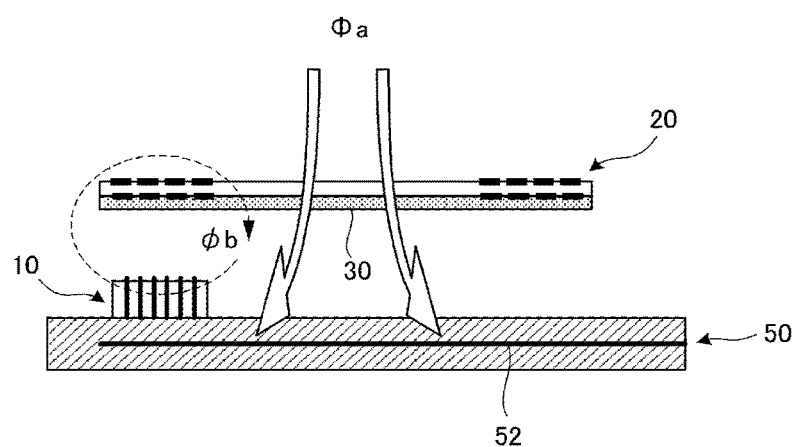
FIG. 17B is a diagram illustrating the induction magnetic field of the antenna device in a case where the permeability of the ferrite sheet 30 (magnetic layer) is low, or in a case where the thickness of the ferrite sheet 30 is small.

FIG. 17A is a diagram illustrating the induction magnetic field of the antenna device in a case where the permeability of the ferrite sheet 30 (magnetic layer) is high, or in a case where the thickness of the ferrite sheet 30 is large. FIG. 17B is a diagram illustrating the induction magnetic field of the antenna device in a case where the permeability of the ferrite sheet 30 (magnetic layer) is low, or in a case where the thickness of the ferrite sheet 30 is small.

In a case where the product of the relative permeability and thickness of the ferrite sheet 30 (magnetic layer) is large, the degree of magnetic coupling between the magnetic flux φa from the communication partner and the coil antenna 20 is high, but the degree of magnetic coupling represented by the magnetic flux φb between the coil antenna 20 and the feed coil 10 is low, as illustrated in FIG. 17A. As a result, the maximum communication distance is short.

In the opposite case, as illustrated in FIG. 17B, the degree of magnetic coupling represented by the magnetic flux φb between the feed coil 10 and the coil antenna 20 is high, but the magnetic flux φa from the communication partner easily passes through the ferrite sheet 30 and is easily coupled to the ground conductor 52. As a result, an eddy current generated in the ground conductor 52 increases, and communication characteristics degrade.

Figures 18A, 18B:
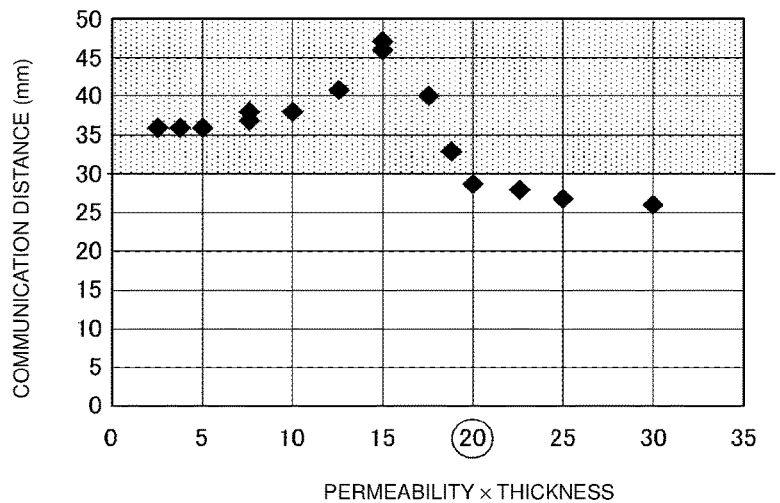
FIG. 18A is a diagram illustrating the relationship between the product of the relative permeability (real part permeability $\mu'$) and the thickness of the ferrite sheet 30 of an antenna device according to a ninth preferred embodiment of the present invention and the maximum communication distance.
FIG. 18B is a diagram illustrating the values thereof.

FIG. 18A is a diagram illustrating the relationship between the product of the relative permeability (real part permeability μ') and the thickness of the ferrite sheet 30 and the maximum communication distance. FIG. 18B illustrates a table of the values thereof. The conditions under which this result is obtained are as follows.

Coil Antenna
  Outer shape 40 mm×40 mm
  3 turns×both sides
  Line width=1 mm
  Distance between lines 1 mm
Ferrite Sheet
  The size is the same as that of the outer shape of the coil antenna
Card of Communication Partner
  A typical card of the ISO 14443A standard (a size of about 80 mm×50 mm)

As illustrated in FIG. 18A and FIG. 18B, in a case where the product of the relative permeability and the thickness of the ferrite sheet 30 is less than 20, a maximum communication distance of about 30 mm is ensured. In a case where the maximum communication distance is about 30 mm or more, stable communication can be performed even in a case where the antenna device is disposed in the terminal housing and communication is performed via the thickness of the terminal housing, or in a case where a certain gap exists between the antenna device and the communication partner.

Tenth Preferred Embodiment

Figure 19A:
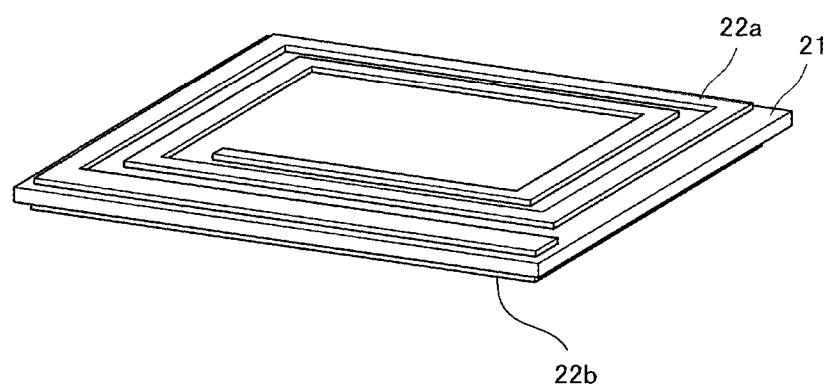
FIG. 19A is a perspective view of the coil antenna 20 of an antenna device according to a tenth preferred embodiment of the present invention.
Figure 19B:
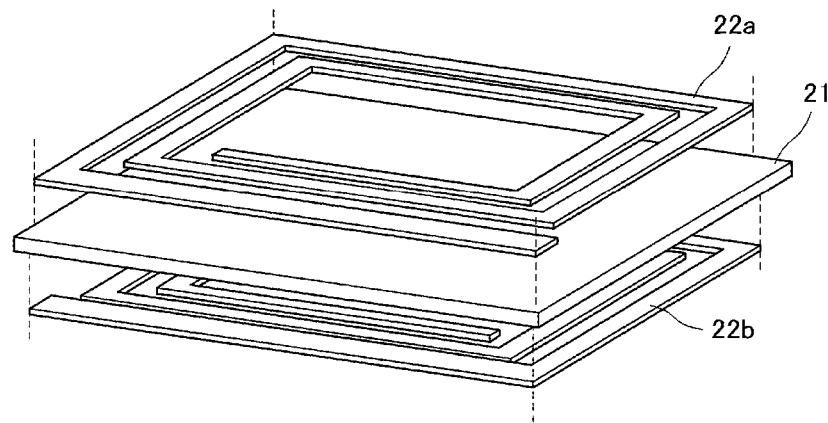
FIG. 19B is an exploded perspective view thereof.
Figure 20A:
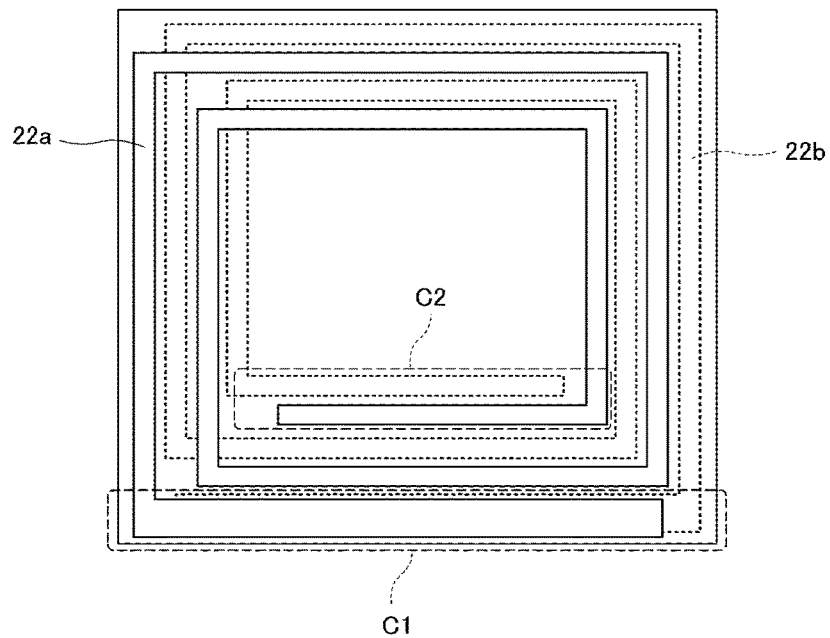
FIG. 20A is a plan view of the coil antenna 20.

In a tenth preferred embodiment of the present invention, a description will be given of optimization of the pattern of coil conductors of the coil antenna. FIG. 19A is a perspective view of the coil antenna 20, and FIG. 19B is an exploded perspective view of the coil antenna 20. FIG. 20A is a plan view of the coil antenna 20, and FIG. 20B is an equivalent circuit diagram of the coil antenna 20.

In the coil antenna 20, the first coil conductor 22*a* is located on the first principal surface (upper surface) of the base sheet 21, which is preferably made of PET or the like, and the second coil conductor 22*b* is provided on the second principal surface (lower surface). The winding direction of the first coil conductor 22*a* and the winding direction of the second coil conductor 22*b* are opposite to each other (the same in perspective view). The equivalent circuit thereof is illustrated in FIG. 20B.

Figure 20B:
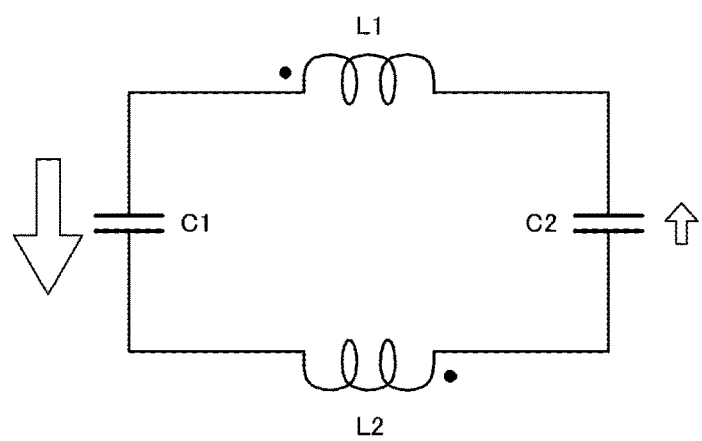
FIG. 20B is an equivalent circuit diagram of the coil antenna 20.

Referring to FIG. 20B, inductors L1 and L2 correspond to the coil conductors 22*a* and 22*b*. A capacitor C1 corresponds to a capacitance that is generated mainly at the vicinities of outer ends of the coil conductors 22*a* and 22*b*, and a capacitor C2 corresponds to a capacitance that is generated mainly at the vicinities of inner ends of the coil conductors 22*a* and 22*b*. Here, in a case where design is performed so that C1>>C2≈0 is satisfied by increasing the area in which the vicinities of the outer ends of the coil conductors 22*a* and 22*b* face each other and decreasing the area in which the vicinities of the inner ends of the coil conductors 22*a* and 22*b* face each other, the portion of the capacitor C2 is substantially in an open state, and a current hardly flows to an electrode near the capacitor C2. That is, the electric field becomes maximum. In contrast, an electrode near the capacitor C1 that is the farthest from the electrode near the capacitor C2 is a maximum current point. That is, the amount of current flowing through the coil conductors 22*a* and 22*b* is large on the outer side and small on the inner side.

As a result, a region where a magnetic field is generated is the outermost side of the coil antenna 20. This means that the equivalent antenna size is large, and thus an antenna with favorable radiation efficiency can be obtained.

Eleventh Preferred Embodiment

Figure 21A:
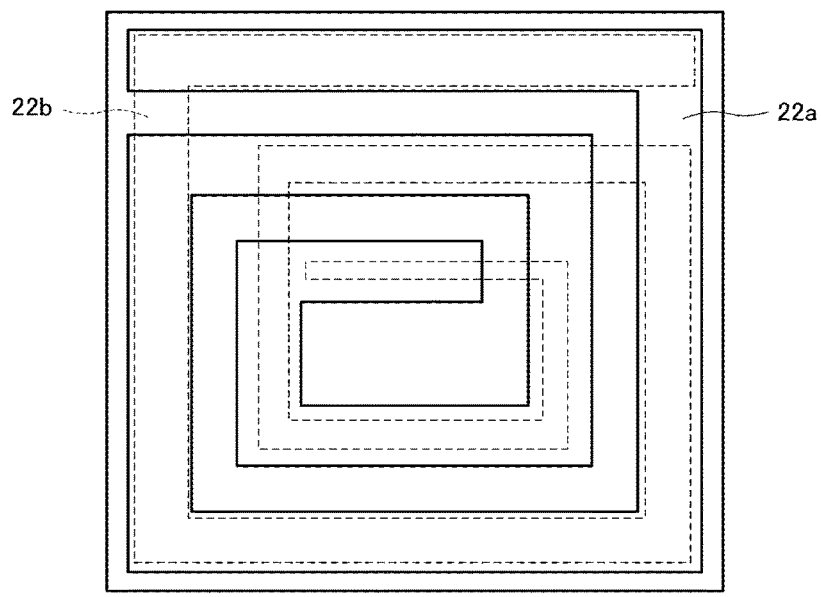
FIG. 21A and FIG. 21B are plan views of a coil antenna according to an eleventh preferred embodiment of the present invention.
Figure 21B:
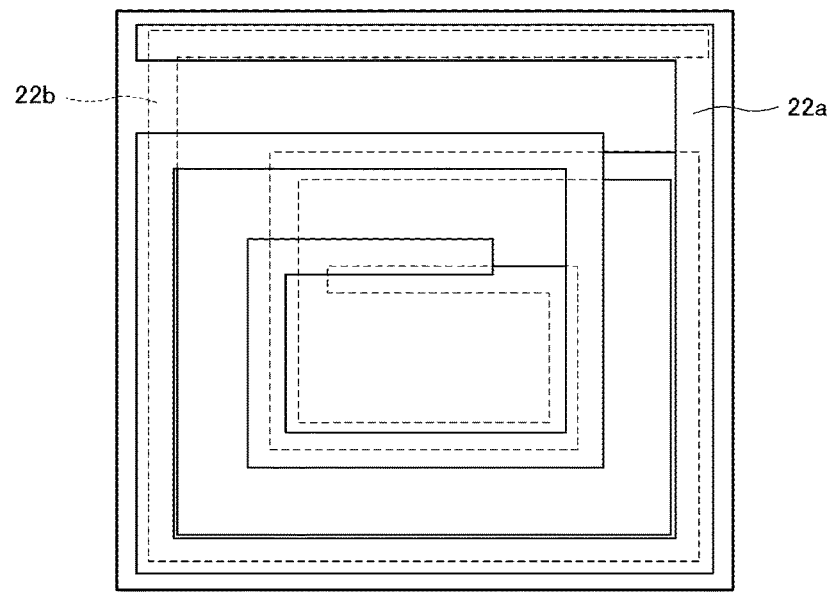

In an eleventh preferred embodiment of the present invention, a description will be given of other two patterns of the coil conductors of the coil antenna. FIG. 21A and FIG. 21B are plan views of a coil antenna. In either example, the capacitance is larger on the outer side of the coil conductors 22*a* and 22*b*, and the capacitance is smaller on the inner side.

In the example in FIG. 21A, the capacitance is adjusted by changing the line width of a coil conductor. Specifically, the line width of the coil conductor 22*a* is constant, whereas the line width of the coil conductor 22*b* decreases from the outer side toward the inner side. In the example in FIG. 21B, the line width of a portion in which the coil conductors 22*a* and 22*b* face each other decreases from the outer side toward the inner side (the amount of positional deviation increases).

Twelfth Preferred Embodiment

In a twelfth preferred embodiment of the present invention, a description will be given of the relationship between the maximum communication distance and the positional relationship between one end of the feed coil 10 and the ferrite sheet 30.

Figure 22A:
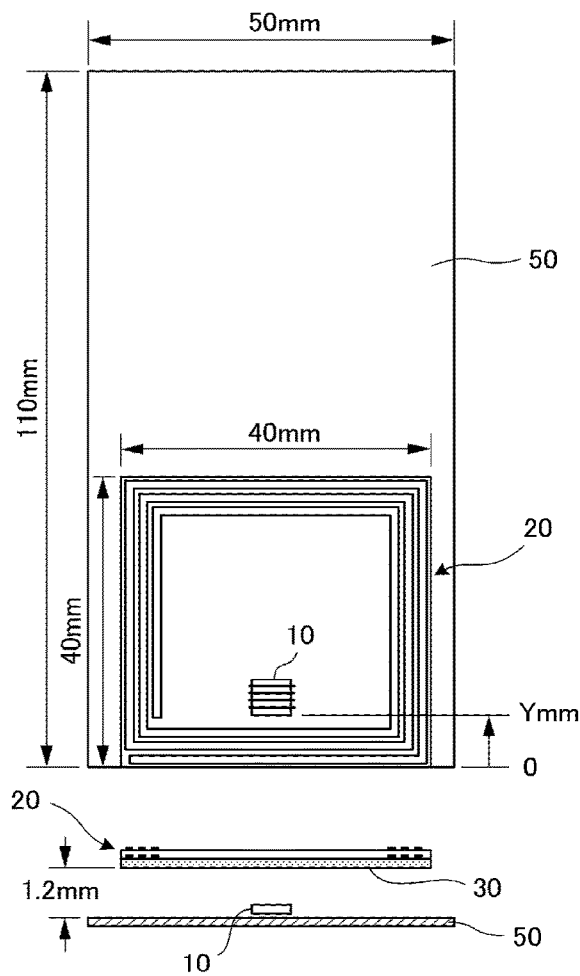
FIG. 22A includes a plan view and a front view of an antenna device according to a twelfth preferred embodiment of the present invention.
Figure 22B:
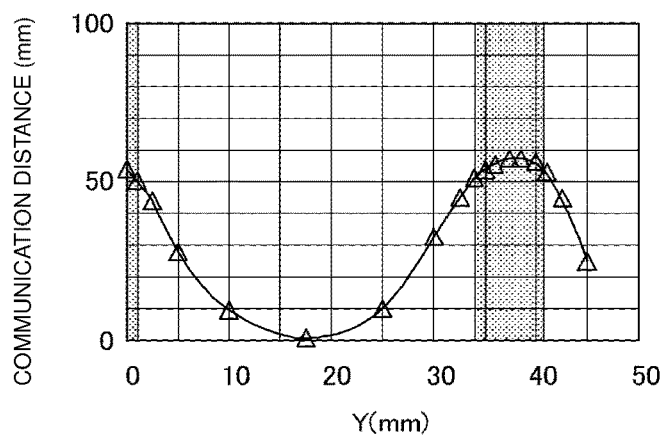
FIG. 22B is a diagram illustrating the relationship between the maximum communication distance and a dimension Y from an end portion of the ferrite sheet 30 to one end of the feed coil 10.

FIG. 22A includes a plan view and a front view of the antenna device, and FIG. 22B is a diagram illustrating the relationship between the maximum communication distance and a dimension Y from an end portion of the ferrite sheet 30 to one end of the feed coil 10. The conditions under which this result is obtained are as follows.

Coil Antenna
  Planar dimension: 40 mm×40 mm
  Thickness: 50 μm
  6 turns×both sides
  Line width=1 mm
  Distance between lines=0.5 mm Ferrite Sheet
  Planar dimension: 40 mm×40 mm
  Thickness: 100 μm
  Relative permeability: about 130
[Printed Wiring Board]
  Planar dimension: 50 mm×110 mm
Feed Coil
  Planar dimension: 5 mm×5 mm
  Thickness: 0.8 μm
Distance Between Ferrite Sheet and Printed Wiring Board
  1.2 mm As illustrated in FIG. 22B, in a case where the dimension Y from the end portion of the ferrite sheet 30 to one end of the feed coil 10 is 0 mm or about 35 mm to about 40 mm, for example, the most favorable characteristics are obtained.

A state where Y=0 mm or 35 mm is a state where one end of the feed coil 10 is in contact with the end portion of the ferrite sheet 30. A state where Y=40 mm is a state where the other end of the feed coil 10 is in contact with the end portion of the ferrite sheet 30.

Figure 23A:
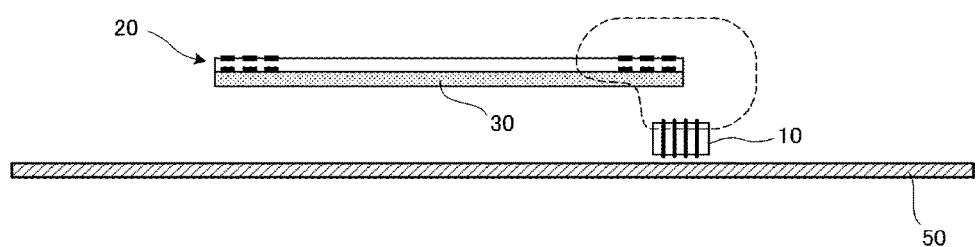
FIGS. 23A and 23B are front views of the antenna device according to the twelfth preferred embodiment of the present invention.
Figure 23B:
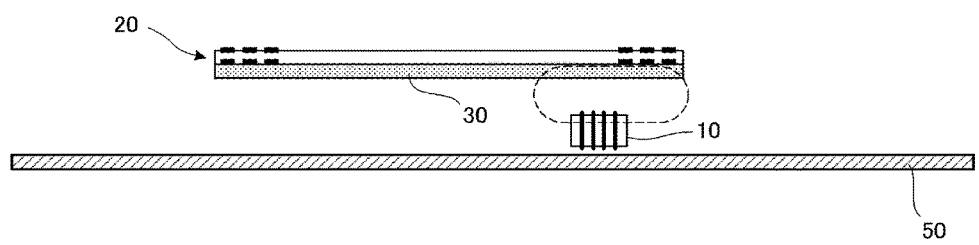

FIGS. 23A and 23B are front views of the antenna device. As illustrated in FIG. 23A, in a case where the opening portion of the feed coil 10 protrudes from the outer shape of the coil antenna 20, the magnetic flux from the feed coil 10 goes around on the outer side of the coil antenna 20, and is interlinked with the opening portion of the coil antenna 20. Accordingly, the feed coil 10 and the coil antenna 20 are coupled to each other more strongly. On the other hand, in a case where the opening portion of the feed coil 10 does not protrude from the outer shape of the coil antenna 20, as illustrated in FIG. 23B, the magnetic flux from the feed coil 10 is not interlinked with the opening portion of the coil antenna 20 due to an influence of the ferrite sheet 30. Therefore, the degree of coupling between the feed coil 10 and the coil antenna 20 is slightly lower than the above-described case.

In this way, the feed coil 10 and the coil antenna 20 are disposed such that the feed coil 10 and the coil antenna 20 partially overlap each other and that the opening portion (end portion) of the feed coil 10 protrudes from the outer shape of the coil antenna 20 in plan view of the coil antenna 20. Accordingly, the degree of coupling between the feed coil 10 and the coil antenna 20 increases, and stable communication characteristics can be obtained even if the distance between the coil antenna 20 and the feed coil 10 increases.

In the above-described preferred embodiments, a description has been mainly given of examples in which the "conductive layer" is a ground conductor of a printed wiring board. Alternatively, a conductive plate such as a liquid crystal panel, a battery pack, or a shield case may be used as the "conductive layer", for example.

As described above, preferred embodiments of the present invention can be utilized for antenna devices and communication terminal apparatuses, in particular, an antenna device used for an RFID tag or a reader/writer that operates in an HF band, and a communication terminal apparatus including the antenna device. Preferred embodiments of the present invention are useful for an RFID system or the like for performing billing or article management.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A communication terminal apparatus comprising:
   a housing;
   a feed circuit provided in the housing;
   a feed coil connected to the feed circuit;
   a coil antenna disposed near the feed coil;
   a magnetic layer provided between the feed coil and the coil antenna; and
   a conductive layer disposed such that the feed coil is sandwiched between the conductive layer and the coil antenna; wherein
   the feed coil and the coil antenna are magnetically coupled to each other via the magnetic layer;
   a winding axis of the coil antenna is perpendicular or substantially perpendicular to a winding axis of the feed coil; and
   in a plan view of the coil antenna, at least a portion of the feed coil overlaps the magnetic layer, at least a portion of the conductive layer is positioned inside an inner periphery of a coil conductor of the coil antenna, a first opening portion of the feed coil overlaps with the coil antenna, and a second opening portion of the feed coil protrudes from the perimeter of the coil antenna so as to be positioned outside of the coil antenna.

2. The communication terminal apparatus according to claim 1, wherein the feed coil is disposed in the housing near an end portion of the housing such that the winding axis of the feed coil is perpendicular or substantially perpendicular to an end surface of the housing.

3. The communication terminal apparatus according to claim 1, wherein the coil antenna is a planar coil that includes at least a first flat surface and a second flat surface which is connected to the first flat surface, the first flat surface is parallel or substantially parallel with a principal surface of the housing, and the second flat surface extends along an end portion of the housing to form an angle with the first flat surface.

4. The communication terminal apparatus according to claim 1, wherein a product of a relative permeability of a magnetic material of the magnetic layer and a thickness of the magnetic layer in units of millimeters is less than twenty.

5. The communication terminal apparatus according to claim 1, wherein the coil antenna is a resonance circuit that has a resonance frequency corresponding or substantially corresponding to a carrier frequency of a communication signal.

6. The communication terminal apparatus according to claim 1, wherein the feed coil and the feed circuit define a resonance circuit that resonates at a frequency corresponding to a carrier frequency of a communication signal.

7. The communication terminal apparatus according to claim 1, wherein the coil antenna is a planar coil that includes at least a first flat surface and a second flat surface which is connected to the first flat surface, and the feed coil is disposed in a region surrounded by the first flat surface and the second flat surface.

8. The communication terminal apparatus according to claim 1, wherein the magnetic layer has a thickness of about 300 μm or less.

9. The communication terminal apparatus according to claim 1, wherein the coil antenna is a planar coil that includes a first principal surface and a second principal surface, the first principal surface is oriented toward an antenna on a communication partner side, the second principal surface is opposite to the first principal surface, and the magnetic layer is arranged so as to cover the second principal surface of the coil antenna.

10. The communication terminal apparatus according to claim 9, wherein
   the coil antenna includes a base sheet including an upper surface and a lower surface, a first coil conductor that is planar and is located on the upper surface of the base sheet that corresponds to a side of the first principal surface, and a second coil conductor that is planar and is located on the lower surface of the base sheet that corresponds to a side of the second principal surface;
   an inductance of the first coil conductor, an inductance of the second coil conductor, and a capacitance generated between the first coil conductor and the second coil conductor define an LC parallel resonance circuit; and
   an area in which the first coil conductor and the second coil conductor face each other in plan view of the coil antenna is largest near outer end portions of the first coil conductor and the second coil conductor and is smallest at inner end portions of the first coil conductor and the second coil conductor.

* * * * *